US006778680B2

(12) United States Patent
Koike

(10) Patent No.: US 6,778,680 B2
(45) Date of Patent: Aug. 17, 2004

(54) APPARATUS FOR DETECTING MARKINGS ON OPPOSITE END FACES OF A WOOD BLOCK

(75) Inventor: Masaru Koike, Obu (JP)

(73) Assignee: Meinan Machinery Works, Inc., Obu (JP)

( * ) Notice: Subject to any disclaimer, the term of this patent is extended or adjusted under 35 U.S.C. 154(b) by 577 days.

(21) Appl. No.: 09/788,548

(22) Filed: Feb. 21, 2001

(65) Prior Publication Data

US 2001/0016050 A1 Aug. 23, 2001

(30) Foreign Application Priority Data

Feb. 23, 2000 (JP) ....................................... 2000-052145

(51) Int. Cl.[7] .......................... G06K 9/00; B23Q 15/00; B26D 5/00; B26D 7/00

(52) U.S. Cl. ....................... 382/100; 144/356; 144/382; 83/364; 83/367; 83/361; 83/520

(58) Field of Search ..................... 382/100; 198/341.05, 198/502.1; 414/222.02; 144/356, 357, 402, 382, 404; 83/75.5, 76.8, 364, 367, 365, 361, 520, 522.13

(56) References Cited

U.S. PATENT DOCUMENTS

| | | | | | |
|---|---|---|---|---|---|
| 4,197,888 | A | * | 4/1980 | McGee et al. | 144/357 |
| 4,427,044 | A | * | 1/1984 | Plough et al. | 144/356 |
| 5,449,030 | A | * | 9/1995 | Mutsuura et al. | 144/357 |
| 6,116,306 | A | * | 9/2000 | Ely | 144/416 |
| 6,176,282 | B1 | * | 1/2001 | Nakamura et al. | 144/215.2 |
| 6,219,585 | B1 | * | 4/2001 | Hughes et al. | 700/167 |
| 6,341,632 | B1 | * | 1/2002 | Sorvik | 144/335 |

FOREIGN PATENT DOCUMENTS

| | | | |
|---|---|---|---|
| JP | 49 009798 | A | 1/1974 |
| JP | 58-110203 | A | 6/1983 |
| JP | 4-31847 | | 5/1992 |
| JP | 2001-310307 | A | 11/2001 |

* cited by examiner

*Primary Examiner*—Daniel Mariam
*Assistant Examiner*—Shefali Patel
(74) *Attorney, Agent, or Firm*—Armstrong, Kratz, Quintos, Hanson & Brooks, LLP

(57) ABSTRACT

A peeler block is formed previously on its opposite end faces with markings the centers of which define an optimum axis about which the block should be rotated for achieving maximum yield in peeling veneer from the block in a rotary veneer lathe. An apparatus is disclosed herein which is designed to detecting such markings at two different detecting stations and finally positioning the block such that its optimum axis is set parallel to the axes of spindles of a rotary veneer lathe is disclosed. At the first station, the markings are detected by a first pair of image sensors such as CCD cameras having lenses with a short focal length hence wide-angle viewing capability. After the detection, the block P is transferred to the second detecting station under the control by a computer control in such a way that the detected respective markings may reach predetermined positions at the second detecting station, where the markings are detected by a second pair of image sensors having lenses with a long focal length for high resolution capability so that the markings are detected with increased accuracy. The block P is further transferred to a third station under the control of the computer control so that it can be positioned at the third station with the optimum axis of the block P expending substantially in parallel to the axes of the lathe spindles.

11 Claims, 23 Drawing Sheets

APPARATUS FOR DETECTING MARKINGS ON OPPOSITE END FACES OF A WOOD BLOCK

BACKGROUND OF THE INVENTION

The present invention relates generally to an apparatus for detecting markings on a wood block. The block has been formed previously on the opposite end faces thereof with markings the centers of which define an axis about which the block should be rotated for achieving maximum yield in peeling veneer from the block in a rotary veneer lathe. Therefore, the invention relates more specifically to an apparatus for detecting such markings and positioning the block on the basis of marking detection data such that the axis of the block is set parallel to the axes of spindles of the veneer lathe.

In peeling veneer from a rotating log or wood block, it is desirable that the block should be rotated about an axis that permits maximum veneer yield. For this purpose, it has been a practice in many veneer mills to determine its optimum axis by using mechanical, optical or any other suitable centering apparatus and then to mark the centers on opposite end faces of the block, i.e. the points at which the optimum axis intersects the respective block end faces. Markings may be provided by any suitable means, for example, by painting or drilling a hole representing such center, as proposed by Publication of Japanese examined patent application H4-31847. In transferring the block to a rotary veneer lathe, the markings are detected and the block is moved to a predetermined position in the veneer lathe where the optimum axis of the block coincide with the rotational axes of the respective spindles of veneer lathe.

The present inventor attempted to locate the markings by using an apparatus as provided schematically in FIG. 27 showing the apparatus in side view and FIG. 28 showing the same apparatus in plan view. The apparatus include a pair of image sensors such as CCD (charge coupled device) cameras 205, 205 each having a lens and an image pickup device, or CCD, on which an image covering part of block end face passed through the lens is produced. The CCD cameras 205, 205 are disposed opposite to one another so as to face the opposite end faces 201*a*, 201*a* of a block 201 which is placed on a pair of V-shaped supports 203, 203 between the cameras. The block supports 203, 203 are movable independently of one another in vertical and horizontal directions as indicated by double-head arrows. The block 201 is previously formed at the center of its opposite end faces 201*a*, 201*a* with drilled holes 201*b*, 201*b* as markings. Though not shown, the apparatus further includes an image processing unit and a computer control.

In operation, light is emitted at an angle against each end face 201*a* of the block 201 so that the hole 201*b* appears as a shaded area while the remaining surface as lighted area. Light reflected from the end face 201*a* and passed through the lens creates on CCD an image of central portion of the end face 201*a* with image of the hole 201*b* appearing as a black circular dot. Information or binarized data of object image is sent to the image processing unit, which then determines the position or displacement of each circular dot with respect to a predetermined reference or zero point on CCD and generates electrical signals representing such displacement. Receiving the signals from the image processing unit, the control generates electrical signals which cause the respective block supports 203, 203 to move independently such that the circular dots may be relocated on the zero points of CCDs, i.e. the centers of respective markings 201*b*, 201*b* on the opposite block end faces 201*a*, 201*a* may be positioned on an imaginary line passing through the zero points of CCDs.

Subsequently, the block 201 is clamped at its opposite ends by a pair of holders (not shown) and then transferred to a rotary veneer lathe (not shown) so that the block 201 may be loaded in the veneer lathe with the center markings 201*b*, 201*b* positioned in alignment with the axes of the lathe spindles.

The inventor noted through experimental operation of the apparatus that, if the apparatus uses CCD camera 205 with a lens whose focal length is relatively large, its high resolution capability makes possible accurate detection of the marking 201*b*, while the area of image to be produced on CCD is narrowed with the result that image of the marking 201*b* may not fall within the image pickup area of CCD and, therefore, failure in marking detection may occur. If a lens with a relatively short focal length is used, on the other hand, the area of image is enlarged, but accurate detection cannot be accomplished because of poor resolution of the lens. As a result, block 201 when placed in the veneer lathe maybe off-centered with respect to the axes of lathe spindles over a range from a few millimeters to more than ten millimeters. In view of the fact that in many veneer mills wood blocks are being peeled to produce thin sheets of veneer, say about 0.6 mm, the above error will seriously affect the resulting veneer yield.

SUMMARY OF THE INVENTION

Therefore, an object of the present invention is to solve the above problems by improving the apparatus which the present inventor used in an attempt to detect the center markings on a peeler block.

More specifically, the present invention is directed to provide an apparatus which detects the markings on a block at least at a first rough detecting stations and a second fine detecting station so that the block is finally positioned with its optimum axis set in parallel with the axes of spindles of a rotary veneer lathe, thereby making it possible in the subsequent process to transfer the block and load the veneer lathe with the block such that its optimum axis coincides with the rotational axes of the veneer lathe spindles.

In order to achieve these objects, the invention contemplates an apparatus for detecting markings on the opposite end faces of a wood block, which comprises a pair of movable support members for supporting the block in such orientation that the axial length of the block extends across the direction in which said support members are moved, and drive means for independently and controllably moving the support members. In the preferred embodiment of the invention, the block is detected at the first and second stations and then moved a third position where the block is finally positioned ready to be transferred to a rotary veneer lathe. For detecting the markings, the apparatus further includes first and second pairs of image sensor means. The image sensor means of the first pair have lenses disposed so as to face the opposite end faces of the block positioned at the first detecting station and image pickup devices on which images of the markings through the lenses thereof are produced, while the second paired image sensor means have lenses disposed so as to face the end faces of the block which is positioned at the second detecting station and similar image pickup devices. The lenses of the first paired image sensor means has a focal length which is smaller than that of the lenses of the second paired image sensor means. In the preferred embodiment, the focal length of the lenses of the first paired image sensor means is 16 mm against 50 mm for the lenses of the second paired image sensor means.

Each image sensor means is connected to image processing means which is operable to determine the position or displacement of marking image produced on the image pickup device with respect to a predetermined reference point on the devices.

The apparatus further includes control means which receives information of the marking image displacement from the image processing means. Because of the relatively short focal length of lenses for the first paired image sensor means, and hence their wide-angle viewing capability, markings on the block end faces can fall well within the viewing area of the first paired image sensor means. Receiving from the image processing means the information of marking images on the image pickup devices of the first paired image sensor means, the control then computes the distances and the directions of movement of the respective support members necessary for the markings on the block at the first detecting station to move to positions corresponding to the reference points on the image pickup devices of the second paired image sensor means and generate signals which causes the drive means to move the support members independently for the computed distance in the computed direction toward the second detecting station.

The control means is also operable also to compute, on basis of information of the displacement of the marking images produced on the image pickup devices of the second paired image sensors means, the distances and the directions of movement of the respective support members necessary for the markings on the block at the second detecting station to move to predetermined positions at the third station and then to generate signals which causes said drive means to move said support members independently for the computed distance in the computed direction toward the third station. Because the lenses of the second paired image sensor means have a longer focal length and hence high resolution capability, the markings can be detected with higher accuracy at the second station and, therefore, the block is moved to the third station where its axis can be positioned accurately with respect to the axes of rotary veneer lathe spindles.

According to the preferred embodiment of the invention, the markings are provided by holes about 30 mm in diameter formed at the respective centers on the opposite end faces of the block, and the image sensor means includes a CCD camera having a charge coupled device (CCD) as the image pickup device.

It is desirable that the apparatus comprises drive mechanism for moving the image sensor means of each pair toward and away from each other according to the axial length of the block to be detected, i.e. the positions of the respective end faces of the block placed at the detecting stations.

In the preferred embodiment, the apparatus has a pair of parallel arm members supporting thereon the block support members for linear movement along such parallel members and independently pivotable about an axis adjacent to the first detecting station for angular movement. The movement of the block suppor members effected by the signal from the control means is accomplished by combination of the linear movement of the block support members and the angular movement of the parallel arm members.

Alternatively, the apparatus may have a pair of vertically movable parallel horizontal members supporting thereon the block support members, so that the support member are movable linearly along such parallel horizontal members and also may be raised with vertical movement of the parallel horizontal members. In the case of this embodiment, the movement of the supporting members effected by the signal from the control means is accomplished by combination of the horizontal linear movement of the block support members and the vertical movement of the parallel horizontal members.

In a further modified embodiment, the third station may be replaced by the second detecting station, so that, after the second detection of the markings at the second station, relocation of the markings may be performed at the same second station.

Features and advantages of the present invention will become more apparent to those skilled in the art from the following description of preferred embodiments according to the invention, which description is made with reference to the accompanying drawings, wherein:

DETAILED DESCRIPTION OF PREFERRED EMBODIMENTS

Figure 1:
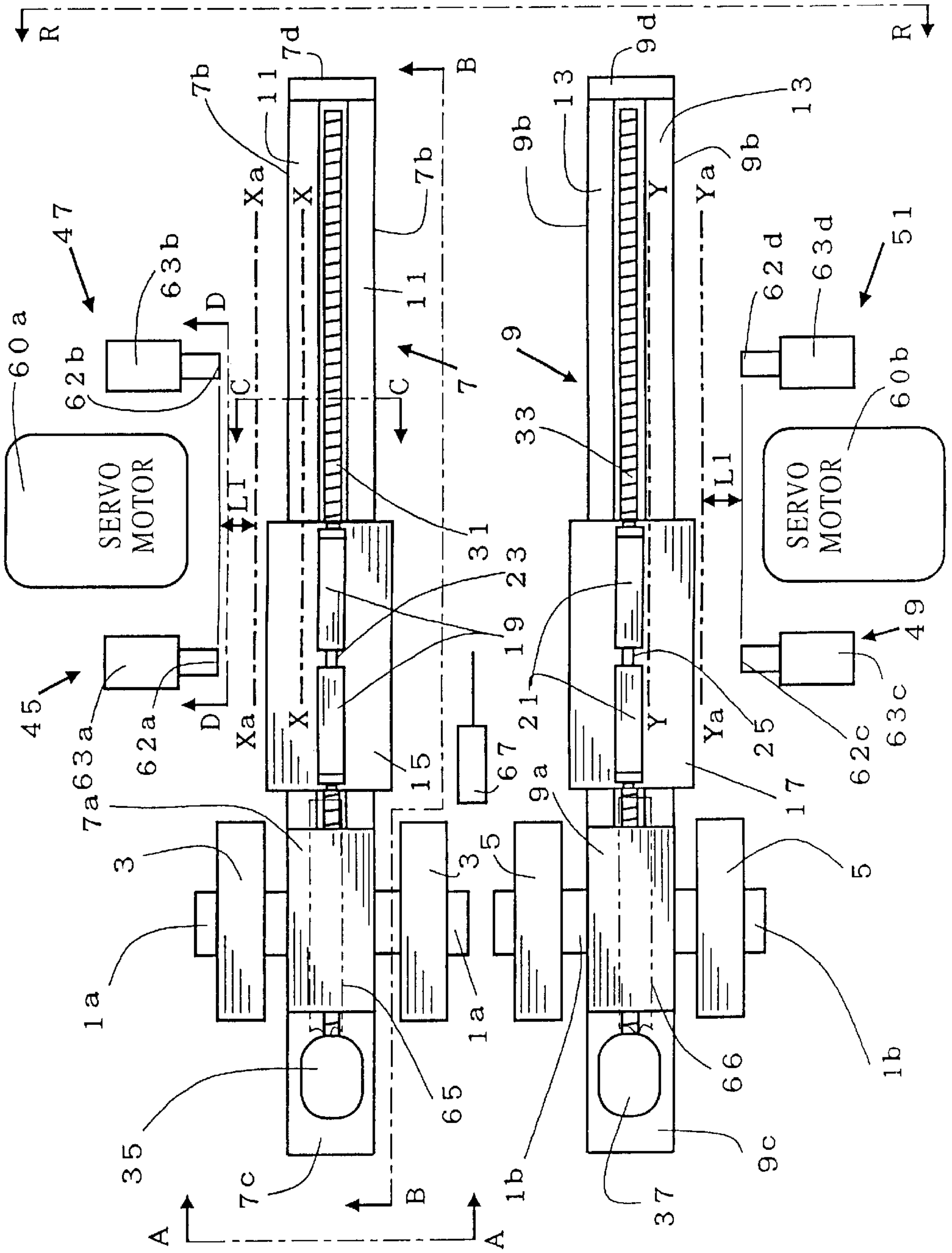
FIG. 1 is a plan view of an embodiment of the apparatus constructed according to the present invention, showing a pair of pivotal arm assemblies, a pair of movable block supports mounted thereon and two pairs of CCD camera assemblies.

The following will describe a preferred embodiment of the invention with reference to FIGS. 1 through 22.

The apparatus of the illustrated embodiment has a pair of pivotal arm assemblies 7, 9 and a pair of controllably movable support members 23, 25 mounted on the respective arm assemblies 7, 9 and having V-shaped rests 19, 21 which are adapted to receive thereon the opposite end portions of a log or a peeler block P having markings T at the center of on its opposite end faces. In the illustrated embodiment, the marking T is provided by a drilled hole having a diameter of about 30 mm. The apparatus further includes two pairs of CCD camera assemblies 45, 49 and 47, 51 which are disposed on opposite outer sides of the arm assemblies 7, 9 and include first and second pairs of CCD cameras 63*a*, 63*c* and 63*b*, 63*d* having lenses 62*a*, 62*c* and 62*b*, 62*d*, respectively, and solid-state image pickup devices such as CCD (charge coupled device). The support members 23, 25 are movable from a first detecting station (FIGS. 12 and 13) through a second detecting station (FIG. 16) to a third transfer position (FIG. 19), as will be described more in detail in later part hereof.

Since the paired pivotal arm assemblies 7, 9, as well as the paired block support member 23, 25, are substantially identical in arrangement and structure, the following will deal mainly with the arm assembly 7 and the support member 23 disposed on the upper side as seen in FIG. 1 of the apparatus.

Figure 2:
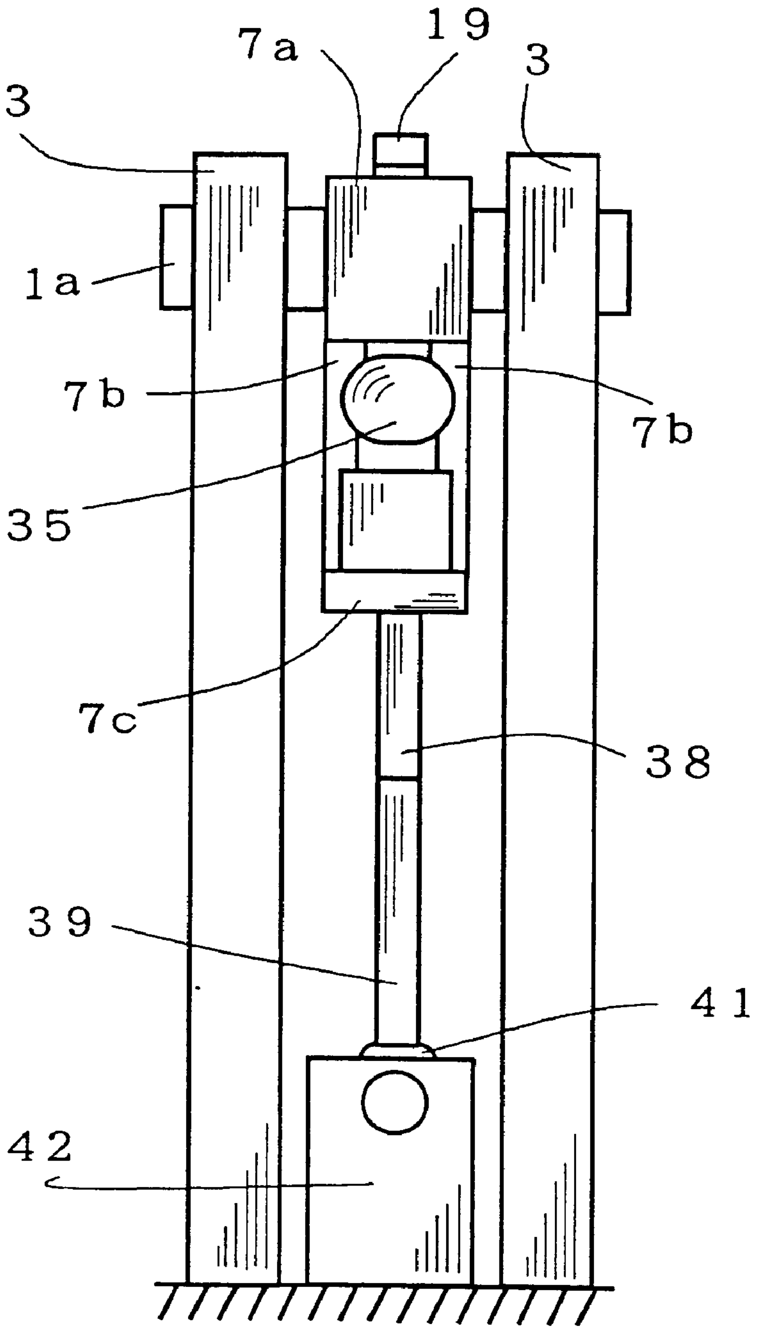
FIG. 2 is a partial side view as seen from line A—A in arrow direction of FIG. 1, showing one of the pivotal arm assemblies of the apparatus.
Figure 3:
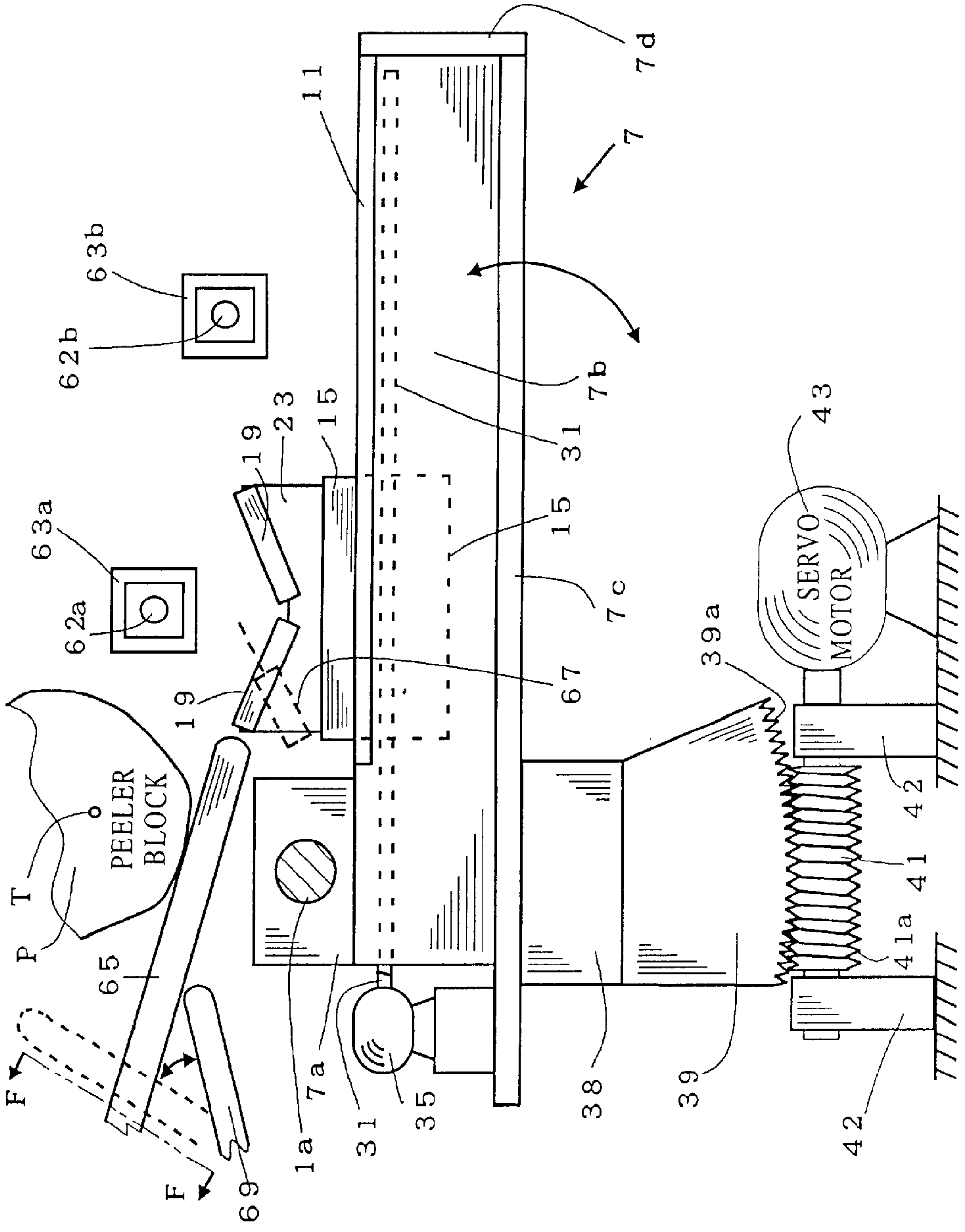
FIG. 3 is a front view as seen from line B—B in arrow direction of FIG. 1, showing the arm assembly of FIG. 2 and respective one of each paired CCD cameras.

Referring specifically to FIGS. 1 through 3, the pivotal arm assembly 7 has a shaft 1*a* extending in alignment with a shaft 1*b* for the other arm assembly 9 and rotatably supported by a pair of uprights 3, 3. The shaft 1*a* rotatably supports thereon a mounting 7*a* via bearing (not shown), and a pair of elongate side plates 7*b* spaced in axial direction of the shaft 1*a* is fixedly mounted to the bottom of the mounting 7*a*. A plate 7*c* is secured to the bottom of the side plates 7*b* and an end plate 7*d* is fixed to the distal ends of the side plates 7*b* and bottom plate 7*c*. The pivotal arm assembly 7 thus constructed is pivotal or controllably swingable about the shaft 1*a*, as will be explained more in detail hereinafter. As shown in FIG. 3, the bottom plate 7*c* is made longer than the side plates 7*b* by the extension projecting beyond the proximal ends of the side plates 7*b* thereby to provide a support base for a reversible servo motor 35 which will be also described in detail later. The side plates 7*b* are formed on the top thereof with two rows of linear guides 11, on which a carriage 15 is slidably mounted for movement along the guides 11. The aforementioned support member 23 having V-shaped block rest 19 is fixedly mounted on the slide carriage 15.

Figure 4:
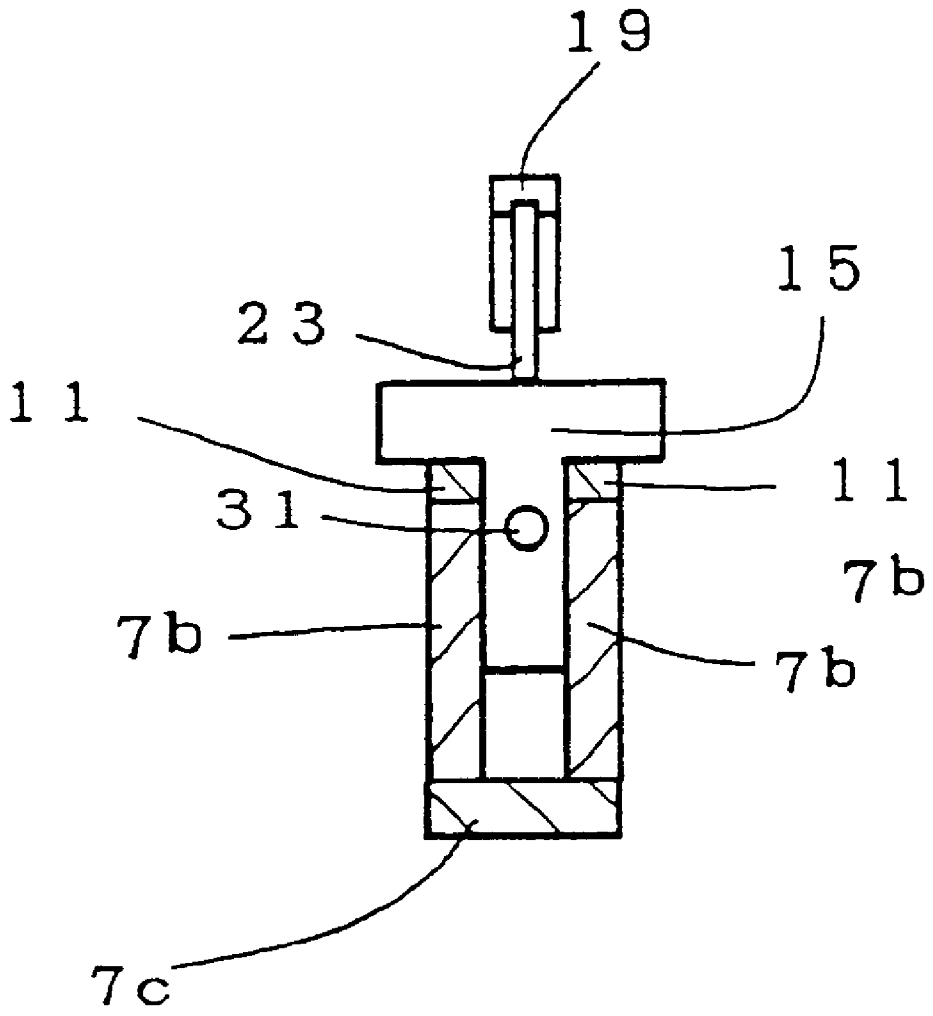
FIG. 4 is a sectional view as seen from line C—C in arrow direction of FIG. 1, showing part of the arm assembly of FIG. 3.

As indicated in FIGS. 3 and 4, the carriage 15 is formed therein with a threaded hole extending along the linear guides 11 to receive therein a lead screw 31. The lead screw 31 is connected to the aforementioned reversible servo motor 35 mounted on the extension of the bottom plate 7*c*, so that rotation of the lead screw 31 causes the carriage 15 and hence the block support member 23 to move reciprocally along the linear guides 11. The servo motor 35 has an absolute type rotary encoder (not shown) for monitoring the rotation of the lead screw 31 and hence the movement of the carriage 15.

As clearly seen in FIG. 3, a sector gear 38 is provided which is fixed to a mounting 38 which is in turn secured to the bottom of the plate 7*c*. The sector gear 38 is formed with a number of teeth 39*a* whose tip ends describe an arc of a circle whose center corresponds to the axis of the shaft 1*a*. The sector gear 38 engages with a worm gear 41 which is rotatably supported on a frame of the apparatus by way of bearings 42, 42 and operatively connected to a reversible servo motor 43. Thus, rotation of the worm gear 41 driven by the motor 43 causes the sector gear 39 to rotate about the shaft 1*a*, with the result that the arm assembly 7 is reciprocally swung as indicated by double-headed arrow in FIG. 3. The servo motor 43 is also equipped with an absolute type rotary encoder (not shown) to monitor the rotation of the worm gear 41 and hence the angular movement of the arm assembly 7.

Apparently, the above description about the arm assembly 7 and its associated parts, elements and mechanisms is applicable to the corresponding counterparts associated with the other arm assembly 9. Namely, the arm assembly 9 having mounting 9*a*, side plates 9*b*, bottom plate 9*c*, end plate 9*d* and linear guides 13 is disposed in parallel relation to the arm assembly 7. A block support member 25 having a V-shaped rest 21 is fixedly mounted on a slide carriage 17, and a servo motor 37 with a rotary encoder and a lead screw 33 received in a threaded hole in the carriage 17 form a mechanism for reciprocally moving the slide carriage 17 along the guides 13. Though not shown in the drawings, a drive mechanism for reciprocally swinging the arm assembly 9, which is similar to the arrangement shown in FIG. 3 for driving the arm assembly 7, is provided on the opposite side of the apparatus. For the sake of description hereinafter, the servo motor for the arm assembly 9 is designated as 44. It is noted that each of drive mechanisms for moving the slide carriages 15, 17 is operable independently of the other, and the same holds true of the respective drive mechanisms for swinging the arm assemblies 7, 9.

Now referring back to FIG. 1, first and second pairs of CCD camera assemblies 45, 49 and 47, 51 are disposed on opposite outer sides of the respective arm assemblies 7, 9. The CCD camera assemblies of each pair, i.e. 45, 49 of the first pair and 47, 51 of the second pair, are arranged in facing relation to each other for taking images covering part of the area on the opposite end faces of a peeler block P when it is placed at the first detecting station (FIGS. 12 and 13) and moved to the second detecting station (FIG. 16), as will be described more in detail in later part hereof. To be more specific, the CCD cameras 63*a*, 63*c* of the first pair are disposed such that the optical axes of their lenses 62*a*, 62*c* are in alignment with each other, and the CCD cameras 63*b*, 63*d* of the second pair are disposed similarly with the optical axes of their lenses 62*b*, 62*d* set in alignment with each other. Since CCD camera assemblies 45, 49, 47, 51 are of substantially the same in construction and operation except the lenses having different focal lengths, the following will describe the first pair of CCD camera assemblies 45, 47 provided on the upper side, as seen in FIG. 1, of the apparatus while having reference to FIGS. 5, 6 and 7.

Figure 5:
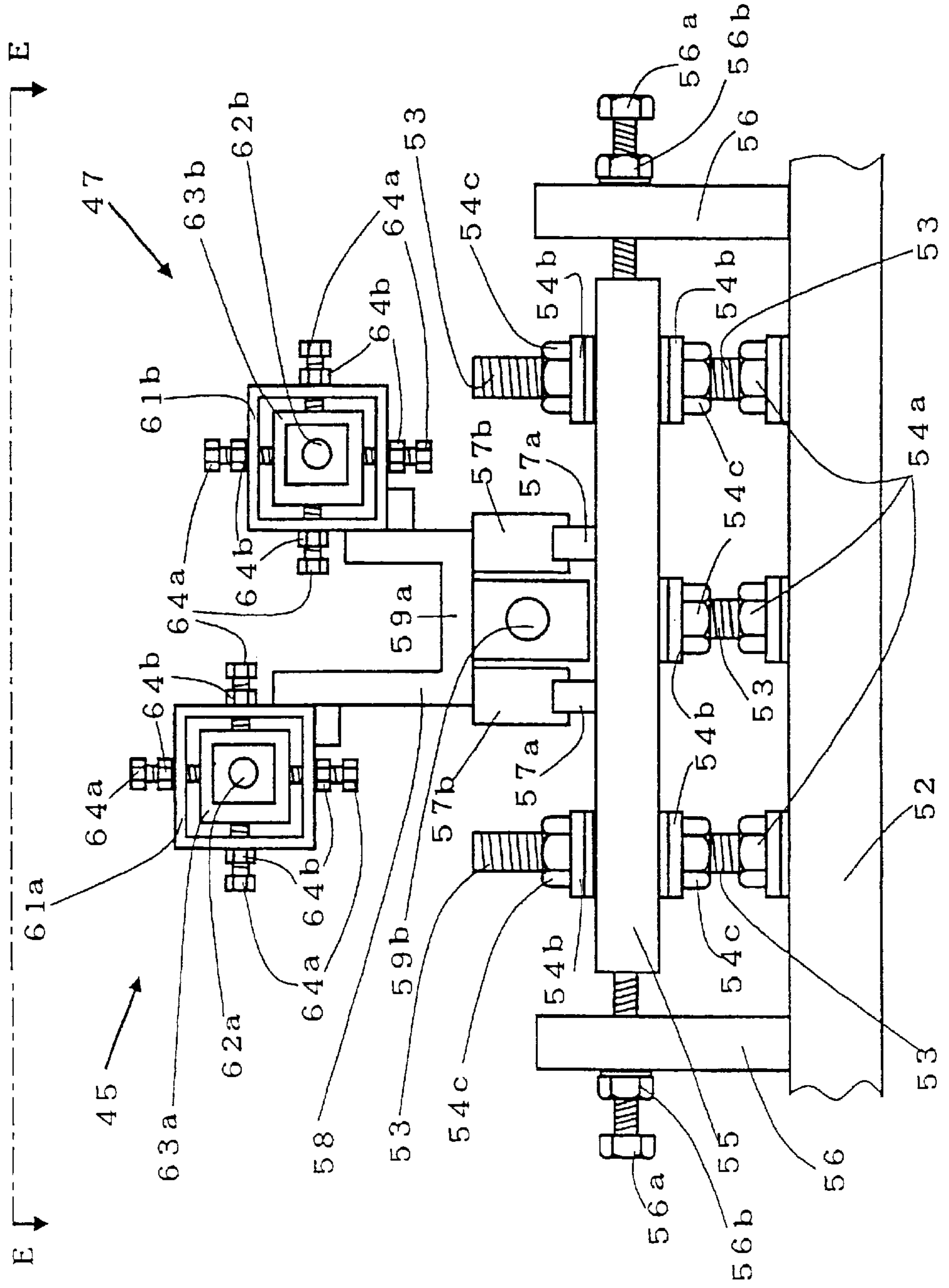
FIG. 5 is a front view as seen from line D—D in arrow direction of FIG. 1, showing arrangement of respective one of each paired CCD camera assemblies located adjacent to the arm assembly of FIG. 3.
Figure 6:
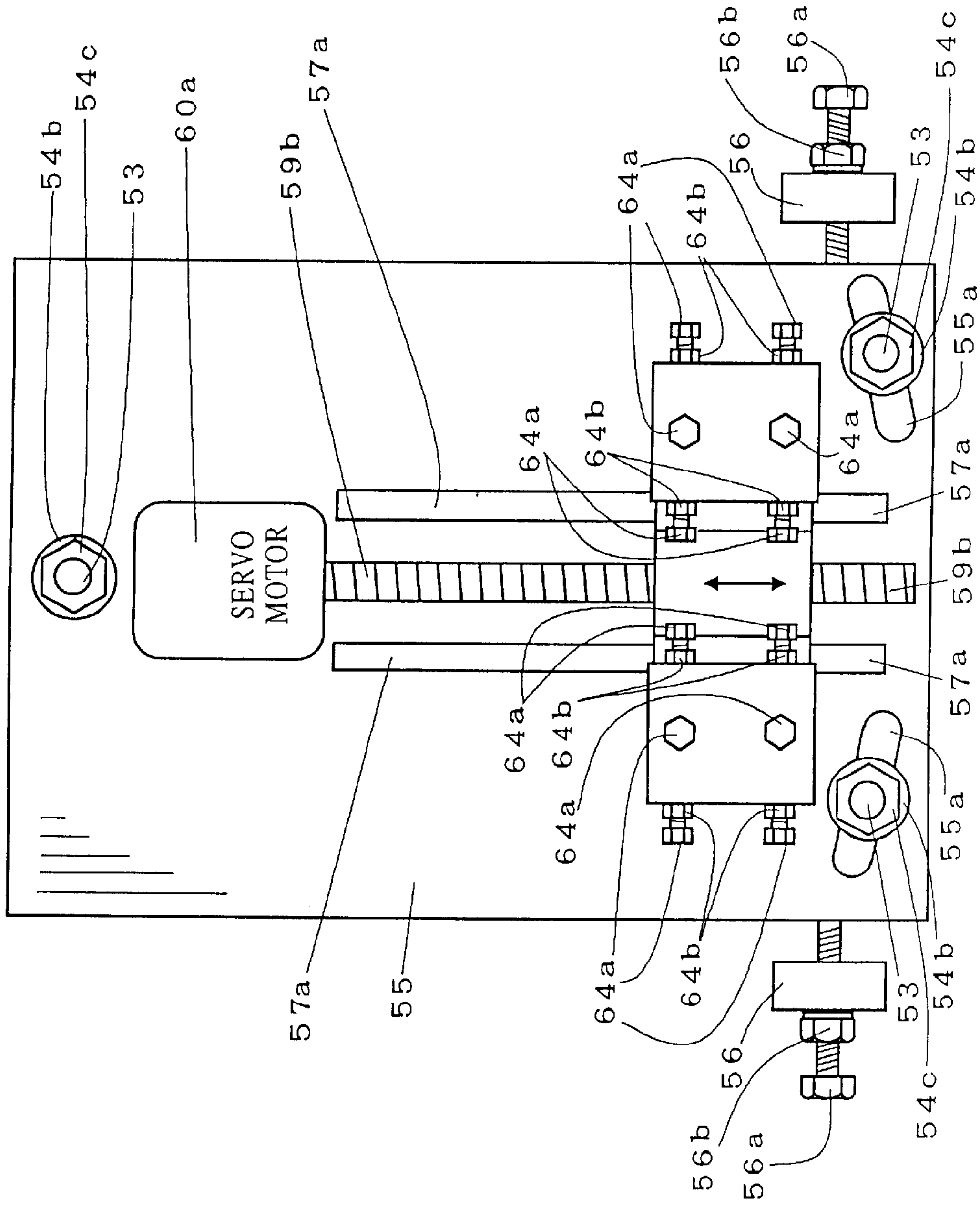
FIG. 6 is a plan view as seen from line E—E in arrow direction of FIG. 5, showing the arrangement of CCD camera assemblies of FIG. 5.

As shown in FIGS. 5 and 6, CCD camera assemblies 45, 47 of the first pair have in common a base block 52 having formed therein vertically threaded holes (not shown) in which three bolts 53, two in the front and one in the back as viewed from the arm assembly 7, are received in upright position and secured by nuts 54*a*. The CCD camera assemblies 45, 47 further have a common support plate 55 having formed therethrough two elongated holes 55*a* receiving therethrough the above two bolts 53 and a third hole (not shown) receiving therethrough the third bolt 53, as shown clearly in FIG. 6. The support plate 55 is positioned through adjustment so as to make its top surface horizontal and secured in position by nuts 54*c* and spherical washers 54*b*. A pair of upright bars 56 is fixedly mounted to the base 52, each having formed therethrough a horizontal threaded hole (not shown), in which a bolt 56*a* is screwed with the tip end pressed against the adjacent side of the support plate 55. These bolts 56*a* may be used to adjust the position of the support plate 55 so that a pair of parallel guide rails 57*a*, which will be described just below, are set in perpendicular orientation with respect to the arm assembly 7.

The paired parallel guide rails 57*a* are fixed on the top surface of the support plate 55 and camera carriages 57*b* are slidably mounted on these guide rails 57*a*. On the carriages 57*b* is fixed a channel support 58 having two vertical portions with different heights. For slidably moving the carriage 57*b* along the guide rails 57*a*, a block member 59*a* having formed therethrough a threaded hole (not shown) extending along the guide rails 57*a* is fixed to the bottom surface of the channel support 58, and a lead screw 59*b* having one end thereof connected to a reversible servo motor 60*a* is inserted through the threaded hole in the block member 59*a*. As shown in FIG. 5, two holders 61*a*, 61*b* each formed as a hollow square tube are fixedly mounted to the upper portions of the channel support 58 for holding the CCD cameras 63*a*, 63*b*. The holders 61*a*, 61*b* are formed through each of their four walls, that is two side walls and top and bottom walls, with two threaded holes (not shown), through which bolts 64*a* are inserted with their tip ends adjustably pressed against the CCD camera 63*a*, 63*b*, as shown in FIG. 5, for holding the cameras securely. Through adjustment of these bolts 64*a*, the CCD cameras 63*a*, 63*b* are positioned such that both lenses 61*a*, 61*b* are set in an imaginary vertical plane extending perpendicularly to the guide rails 57*a* and also that the optical axes of the lenses 62*a*, 62*b* are oriented parallel to the guide rails 57*a*.

As mentioned earlier, the other two CCD camera assemblies 49, 51 disposed on the outer side of the arm assembly 9 are of the same structure and arranged in the same manner as the camera assemblies 45, 47. It is to be noted, however, that the lenses 62*a*, 62*c* of the first paired CCD cameras 63*a*, 63*c* have a focal length of 16 mm for wide-angle viewing capability, while the lenses 62*b*, 62*d* of the second paired CCD cameras 63*b*, 63*d* have a focal length of 50 mm for higher resolution. It is also noted that the servo motor for the CCD camera assemblies 49, 51 are shown in FIG. 1 and designated by 60*b*.

Figure 7:
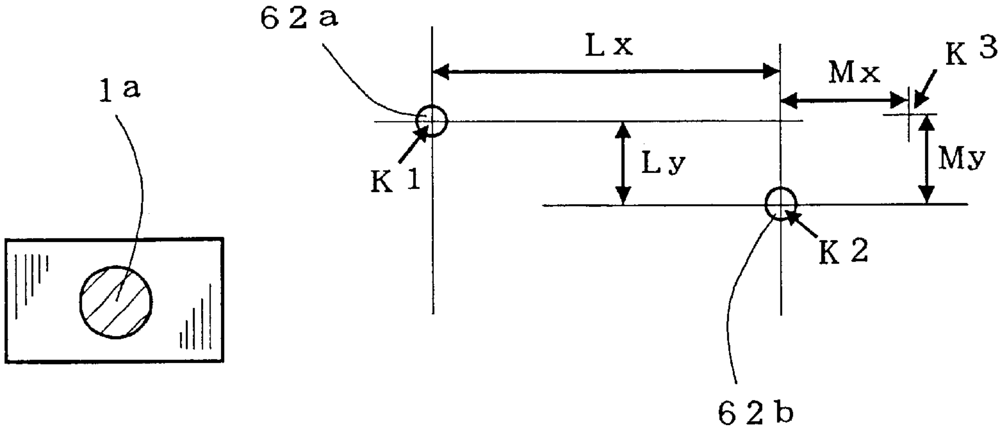
FIG. 7 is an illustrative schematic diagram showing the positional relationship of lenses of the CCD cameras of FIGS. 5 and 6 a target point which is to be reached by the center of the marking on a peeler block.

Referring to FIG. 7 showing the positional relationship of lenses 62*a* and 62*b* of CCD cameras 63*a*, 63*b* of FIG. 5, wherein symbols K1 defined by intersection of horizontal and vertical lines at the first detecting station denotes any point on the common optical axis of the lenses 62*a*, 62*c* of the first paired CCD cameras 63*a*, 63*c*, while K2 also defined by intersection of two lines at the second detecting station designates any point on the common optical axis of the lenses 62*b*, 62*d* of the second paired CCD cameras 63*b*, 63*d*. K3 designates any point on an imaginary line extending at the third station in parallel to the above optical axes of the lenses, which is to be reached by the centers of the respective markings T on the peeler block P after marking detection at the first and second detecting stations has been completed. In a given vertical plane as shown in FIG. 7, point K2 is spaced horizontally by distance Lx and vertically downward by distance Ly from point K1. Point K3 is spaced horizontally by distance Mx and vertically upward by distance My from point K2. It is noted that My is slightly greater than Ly, that is point K3 is positioned slightly higher than point K1. Though not shown in the drawing, as a matter of course, the same arrangement is true of the lenses 62*c*, 62*d* of the CCD cameras 63*c*, 63*d*. That is, a mirror image of the illustration of FIG. 7 is applicable to the arrangement of the lenses 62*c*, 62*d* and point K. Information of data representing values for the spaced distances Lx, Ly, Mx, My is previously stored in a computer control 91 (FIG. 11) of the apparatus.

Referring again back to FIG. 1, Xa—Xa designates an imaginary line which is spaced by distance L1 from the lenses 62*a*, 62*b* of CCD cameras 63*a*, 63*b*, and an object on which line is brought in focus on the CCDs incorporated in the CCD cameras 63*a*, 63*b*. That is, the CCD cameras 63*a*, 63*b* are so constructed that an object spaced from the lenses 62*a*, 62*b* by distance L1 is focused on their CCDs. Similarly, the CCD cameras 63*c*, 63*d* are so designed that an object on line Ya—Ya, which is spaced by the same distance L1 from the lenses 62*c*, 62*d*, is brought in focus on the CCDs of the cameras 63*c*, 63*d*. Apparently these two lines Xa—Xa and Ya—Ya are variable or movable toward and away from each other depending on the movement of CCD cameras 63*a*, 63*b* and 63*c*, 63*d*.

Dash-and-dot lines X—X and Y—Y shown in FIG. 1 designate fixed reference lines against which the current position of the lenses 62*a*, 62*b* and 62*c*, 62*d* are determined. For this purpose, each of the servo motors 60*a*, 60*b* for moving CCD camera assemblies 45, 47 and 49, 51 is equipped with an absolute type rotary encoder (not shown) for monitoring the operation of the motors 60*a*, 60*b* and generating to the control 91 electrical signals representing the current positions of the CCD camera lenses 62*a*, 62*b* and 62*c*, 62*d* with respect to the references lines X—X and Y—Y, respectively.

Though not shown in the drawings, a light source such a fluorescent lamp is provided adjacent to each of the CCD camera assemblies 45, 47, 49, 51. The light source is preferably located such that the light is emitted obliquely against the end face of a block P so that the drilled hole as the marking T appears as a shaded area and the remaining portion on the block end face as a lighted area. Light reflected from the end face and passed through each lens creates a monochromic image on the CCD of CCD camera. If surrounding condition permits, natural light may be used. Monochromic image produced on the CCD is binarized or converted according to a threshold value into binary data of "1" or "0" for each pixel in a known manner in the art. As a result, a circular dot image appears on CCD which corresponds to the shaded area and hence the marking T on the block end face. Such image data is transmitted from each CCD camera to an image processing unit 90 (FIG. 11) which performs pattern searching by absolute positioning method to determine the circular dot position with respect to a predetermined reference or zero point on CCD, which zero point corresponds to a point defined by intersection of the optical axis of the lens and the plane of the CCD. Information of circular dot position with reference to the zero point is sent from the image processing unit 90 to the control 91.

As an incidental matter with reference to the illustrated embodiment, the Image Processor Model CV-500 of Keyence Corporation, Osaka, Japan is employed as the image processing unit 90, and the CCD Camera Model CV-050 of Keyence Corporation is used as the CCC camera 62*a*, 62*b*, 62*c*, 62*d*.

Referring again to FIGS. 1 and 3, a limit switch 67 is provided for detecting the presence of a peeler block P on the support members 23, 25 which are placed at the first detecting station where the block P has just been received by the rests 19, 21. As seen most clearly in FIG. 3, above the shafts 1*a*, 1*b* for the arm assemblies 7, 9 is disposed a pair of stationary spaced parallel guide bars 65, 66 (only one being shown) slanting downward so as to allow a block P to roll down onto the rests 19, 21. As will be described more in detail in later part hereof with reference to FIG. 9, the guide bars 65, 66 are disposed such that the outer lateral sides 65*a* and 66*a* thereof are in alignment with the aforementioned imaginary lines X—X and Y—Y, respectively. As shown in FIG. 3, a pair of stop bars is located between and adjacent to the guide bars 65, 66. These stop bars 69 are operable to move between their stop position midway of the guide bars 65, 66 as indicated by dotted line where a block P is prevented from rolling down along the guide bars 65, 66 and their retracted position indicated by solid line allowing the block P to roll down toward the rests 19, 21.

Figure 8:
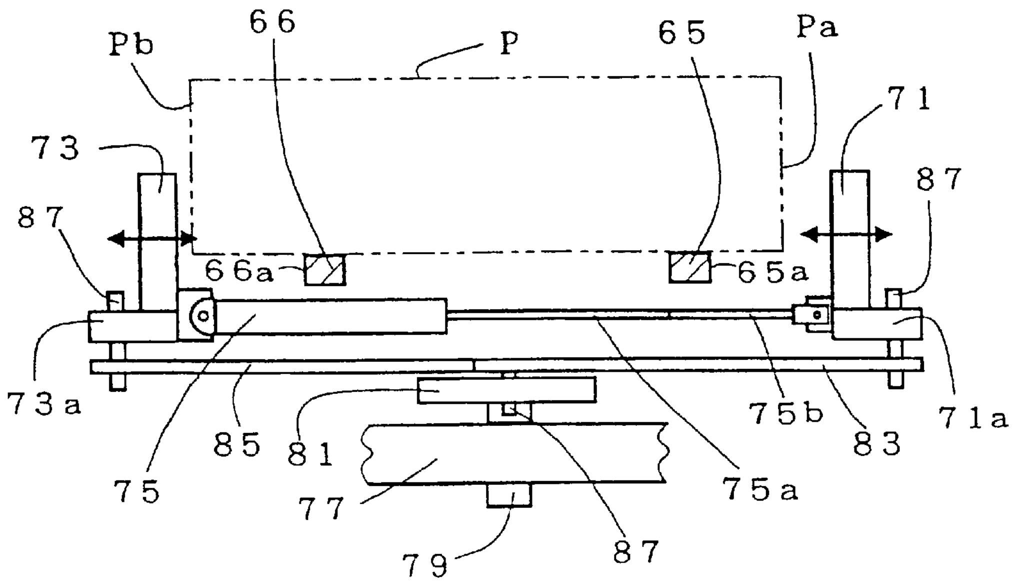
FIG. 8 is a view as seen from line F—F in arrow direction of FIG. 3, showing an apparatus for axially centering a block.
Figure 9:
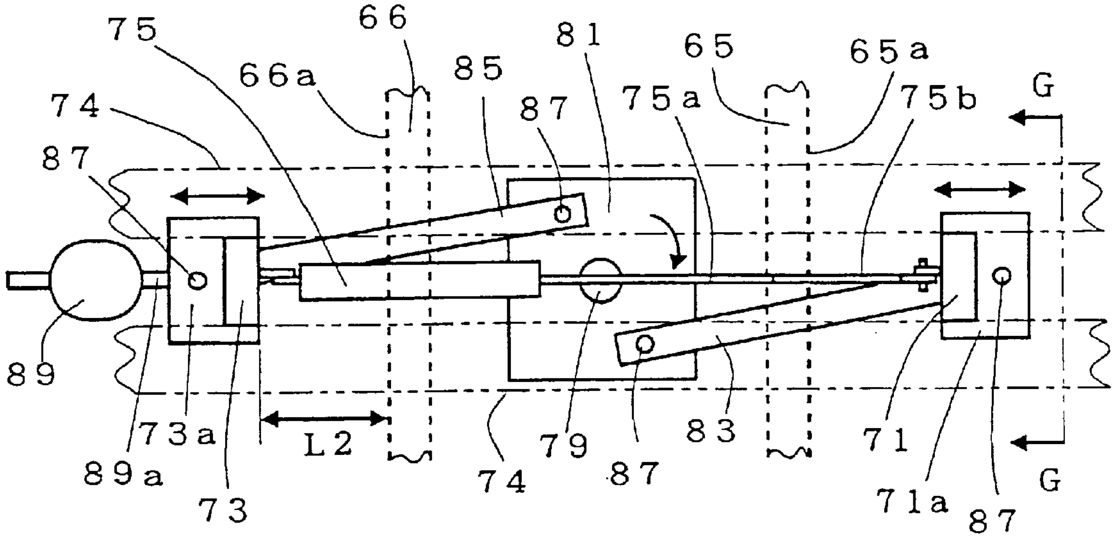
FIG. 9 is a plan view of the centering apparatus of FIG. 8.
Figure 10:
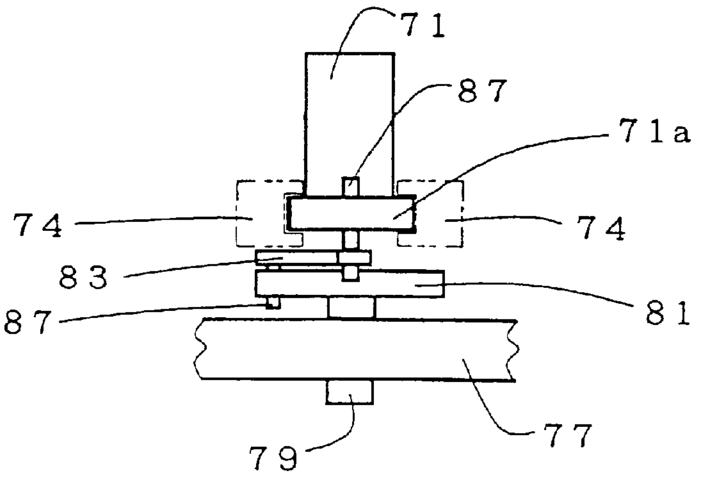
FIG. 10 is a view as seen from line G—G in arrow direction of FIG. 9.

Now having reference to FIGS. 8, 9 and 10, there is shown an apparatus for axially centering a block P with respect to the stationary guide bars 65, 66. In FIG. 8, the block P is shown by phantom line as placed on the guide bars 65, 66 and whose opposite end faces are indicated by symbols Pa, Pb. The centering apparatus includes a pair of push plates 71, 73 disposed outside the guide bars 65, 66 facing and spaced from each other by the same distance from the respective adjacent guide bars 65, 66. The centering push plates 71, 73 have bottom portions 71*a*, 73*a* (only one being shown in FIG. 10) which are engaged at the opposite sides thereof with parallel linear guides 74 shown by phantom lines in FIG. 9 and FIG. 10, thus allowing the plates 71, 73 to move reciprocally along the linear guides 74 as indicated by double-head arrows. The centering apparatus further includes an air cylinder 75 whose base end is connected to the bottom portion 73*a* of the push plate 73. A piston rod 75*a* of the air cylinder 75 has an extension 75*b* which is pin-connected to the bottom portion 71*a* of the other push plate 71. Below the air cylinder 75 is provided a linkage including a rotator 81 located centrally between the push plates 71, 73 and rotatably mounted by way of a bearing (not shown) on a shaft 79 which is fixed to a base member 77, and link arms 83, 85 having one ends thereof connected to the rotator 81 and the other ends to the respective push plates 71, 73 by way of pins 87.

In operation, when the air cylinder 75 is actuated to retract its piston rod 75*a*, the rotator 81 is turned in arrow direction as indicated in FIG. 9 and, simultaneously the push plates 71, 73 are moved toward each other along the guides 74 for the same distance. When the air cylinder 75 is operated to extend its piston rod 75*a*, on the other hand, the rotator 81 is turned in reverse direction with simultaneous movement of the push plates 71, 73 for the same distance away from each other. That is, the distances between the inner edges of the push plates 71, 73 and the outer edges of their associated guide bars 65, 66 are always the same at any position which has been reached the centering push plates 71, 73. Such distance indicated by L2 in FIG. 9 varies depending on the position of the push plates 71, 73, which position is determined by the axial length of the block P as measured between its opposite end faces Pa, Pb. For measuring this distance L2 after the block P has been axially centered, a liner encoder 89 having a scale 89*a* is connected to the centering push plate 73. Since the guide bars 65, 66 are disposed with the outer lateral sides 65*a* and 66*a* thereof positioned in alignment with the aforementioned imaginary lines X—X and Y—Y as mentioned earlier, the distance L2 corresponds to the length between the respective end faces Pa, Pb of the block P and the lines X—X, Y—Y, respectively.

Figure 11:
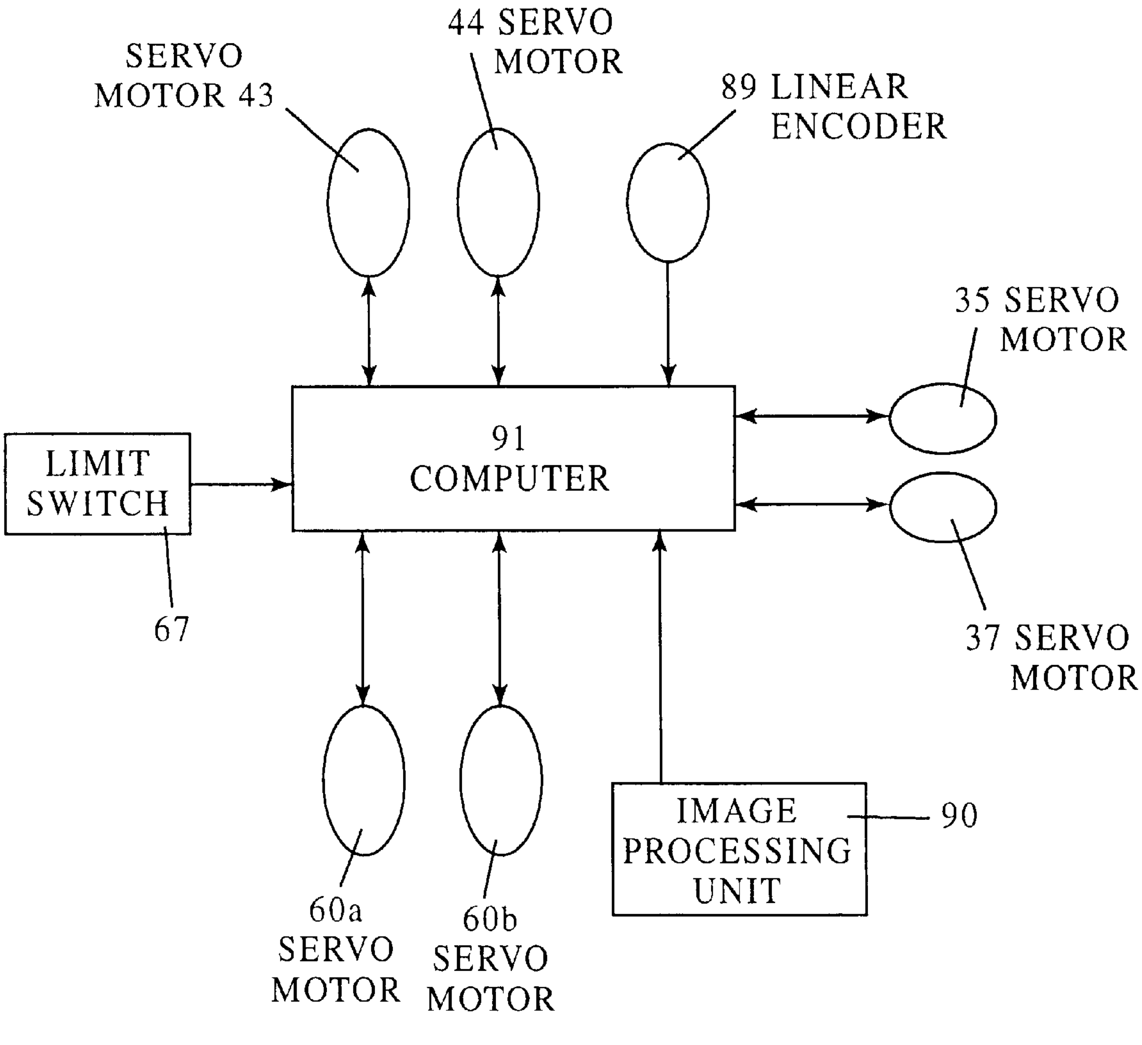
FIG. 11 is a schematic diagram showing electrical connection of various parts and elements to a control unit of the apparatus.

Referring to FIG. 11 showing a block diagram of electrical connection, various electrical signals from the limit switch 67, image processing unit 90, servo motors 35, 37, 43, 44, 60*a*, 60*b* and linear encoder 89 are transmitted to the control 91. As indicated by double-head arrows, the servo motors are feedback controlled by the control unit 91.

The following will explain the operation of the apparatus of the above-described embodiment while having reference also to FIGS. 12 to 22.

At the beginning of each operating cycle of the apparatus, various assemblies and parts thereof are placed in their initial positions. That is, both arm assemblies 7, 9 are placed in their horizontal position as shown in FIG. 3, the slide carriage 15, 17 are positioned at the first detecting station as shown in FIGS. 1 and 3. Furthermore, the stop bars 69 are set in their operative stop position as indicated by dotted line in FIG. 3, and the cylinder 75 is in such a state that its piston rod 75*a* is fully extended to place the centering push plates 71, 73 as shown in FIGS. 8 and 9.

With the apparatus set in such a state, a peeler block P which has been previously formed on its opposite end faces Pa, Pb with center markings or drilled holes T is placed onto the guide bars 65, 66 by manual operation or using any suitable equipment. The block P rolls down on the guide bars 65, 66 until it is brought into contact with and stopped by the stop bars 69. Then, the air cylinder 75 is actuated by a manual or automatically generated signal to retract its piston rod 75*a* into the cylinder 75, so that the push plates 71, 73 are moved toward each other while turning the rotator 81 in arrow direction as shown in FIG. 9. For example, if the block P is then placed on the guide bars 65*a*, 66*a* with one end face Pb positioned closer to the push plate 73 than the other end face Pb to the plate 71 as shown in FIG. 8, firstly the plate 73 is brought into contact with the block end face Pb to move the block rightward as seen in the drawing until the block end face Pa is brought into contact with the approaching push plate 71. Thus, the block P is axially centered with respect to the stationary guide bars 65, 66. During such centering operation, the scale 89*b* is moved together with the push plate 73, and the linear encoder 89 connected to the scale 89*b* determines the distance L2 when the push plates 71, 73 have been stopped in contact with the opposite end faces Pa, Pb of the block P and generates to the control 91 a signal representing the measurement of distance L2. After the block P has been axially positioned, the cylinder 57 is actuated to move its piston rod 75*a* to its original extended position.

Figure 12:
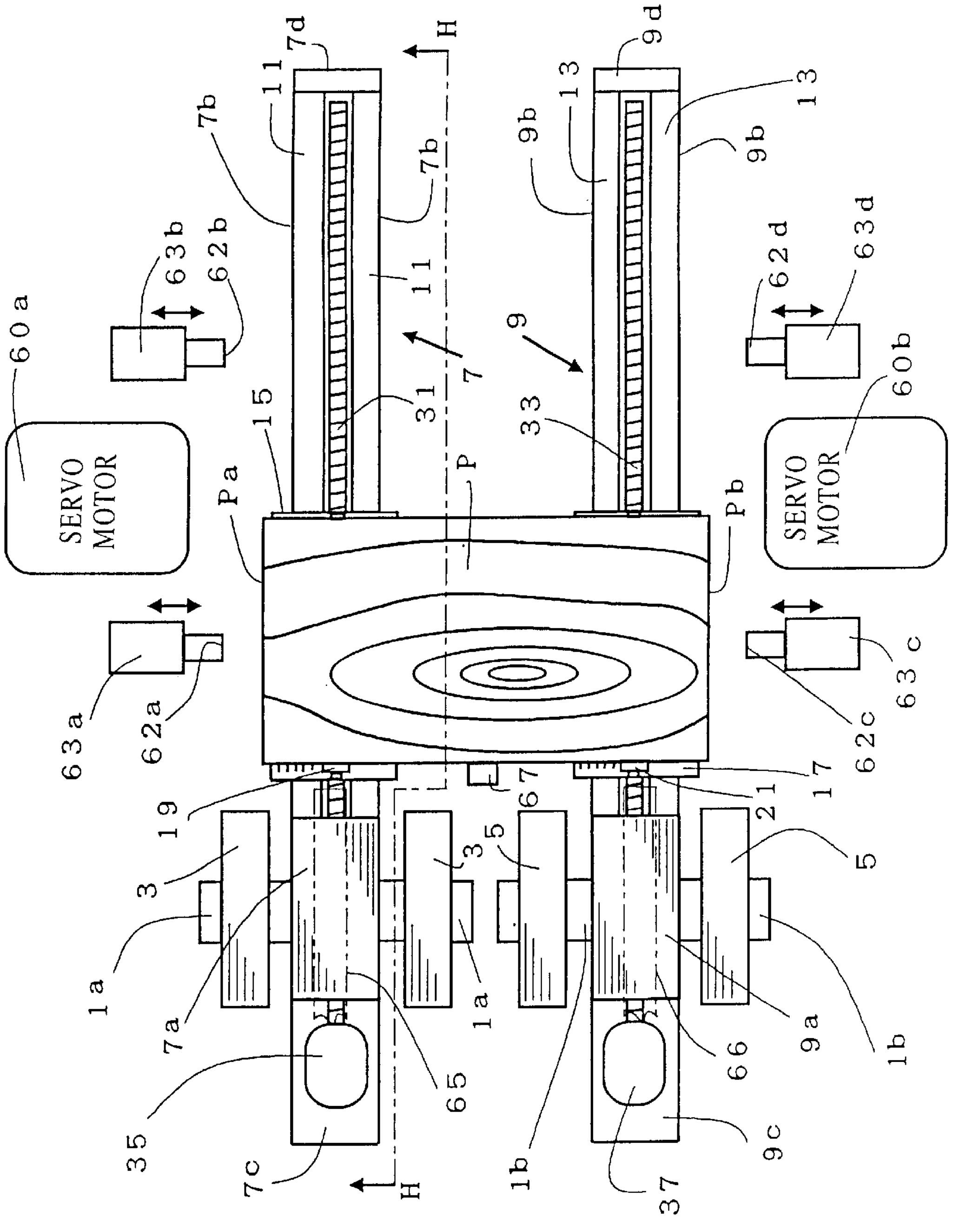
FIG. 12 is an illustrative plan view describing the operation of the apparatus, wherein a peeler block is located at a first detecting station.
Figure 13:
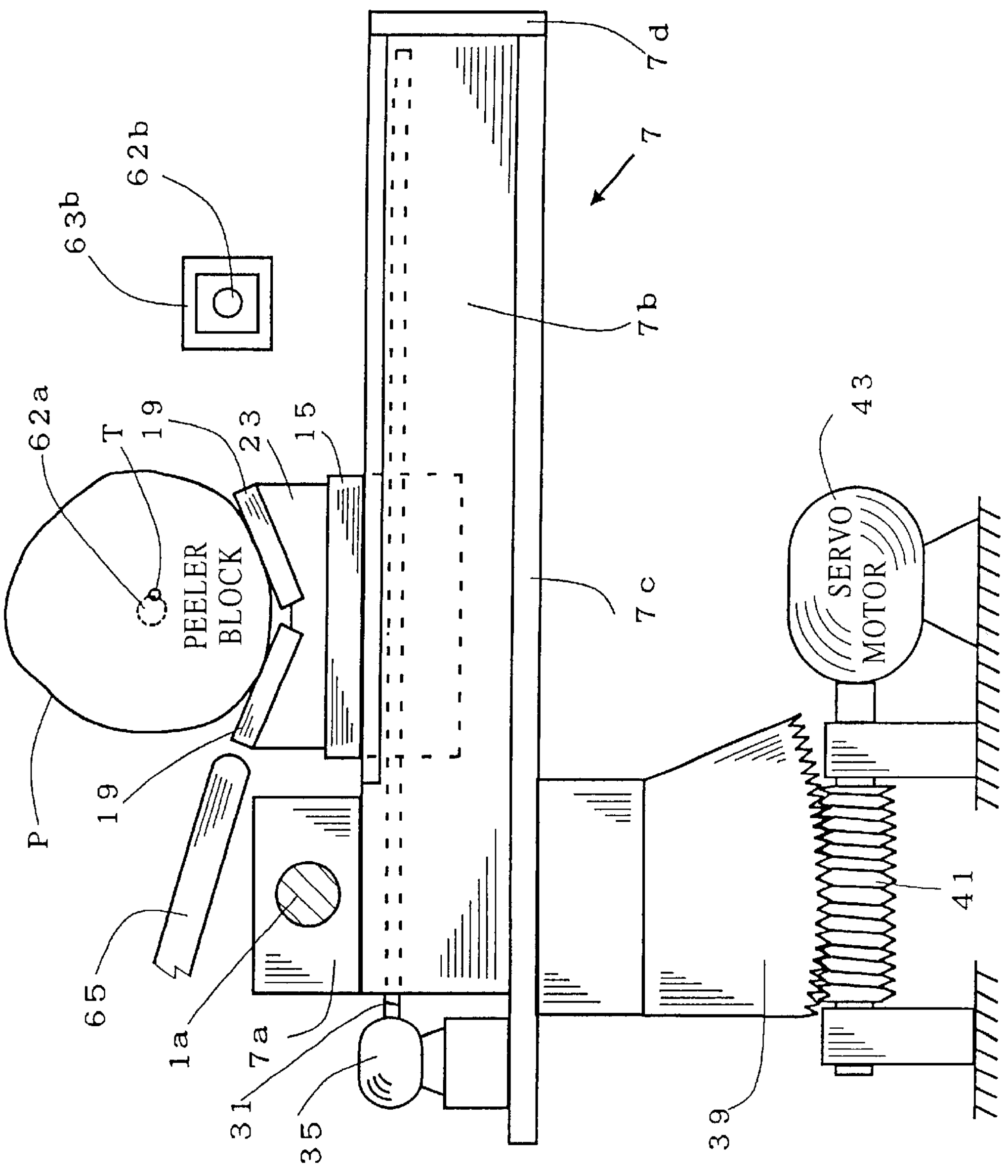
FIG. 13 is a front view as seen from line H—H in arrow direction of FIG. 12.

Subsequently, the stop bars 69 are activated from a manual or automatically generated signal to move down to their inoperative position as shown by solid line in FIG. 3, thereby allowing the block P to move again rolling down on the guide bars 65, 66 and then be placed onto the V-shaped rests 19, 21 of the support members 23, 25 as shown in FIGS. 12 and 13. When the block P has rolled off the guide bars 65, 66 and transferred onto the rests 19, 21, the limit switch 67 is actuated to generate to the control 91 a signal representing that the block P has been placed on the rests 19, 21. Responding to such signal, the control 91 operates to compares the sum of values for distances L2 and L1 with the current position distances of the lenses 62*a*, 62*b* and 62*c*, 62*d* with respect to the lines X—X and Y—Y, respectively. If the former is greater than the latter, i.e. when the lenses 62*a*, 62*b* are located too close to the block end faces for proper focusing, the control 91 transmits a signal to operate the servo motors 60*a*, 60*b*, causing the CCD camera assemblies 45, 47 and 49, 51 to move along the guide rails 57*a* away from the arm assemblies 7, 9 until a stop signal is generated by the control 91 when the current position distance of the CCD camera lenses 62*a*, 62*b* and 62*c*, 62*d* has become substantially equal to the distance corresponding to the sum of L2 and L2. On the other hand, in the event that the former distance is smaller than the latter, i.e. the lenses are located too far from the object for detection, the control 91 transmits a signal to operate the servo motors 60*a*, 60*b*, causing the CCD camera assemblies 45, 47 and 49, 51 to move toward the arm assemblies 7, 9, until a stop signal is generated by the control 91 when the current position distance of the lenses 62*a*, 62*b* and 62*c*, 62*d* has become substantially equal to the distance corresponding to the sum of L2 and L2. As a result of such operation of the motors 60*a*, 60*b*, the CCD cameras 63*a*, 63*b* and 63*c*, 63*d* are moved to a position where the lines Xa—Xa and Ya—Ya have shifted to positions corresponding to the ends faces Pa, Pb of the block P.

Figure 14:
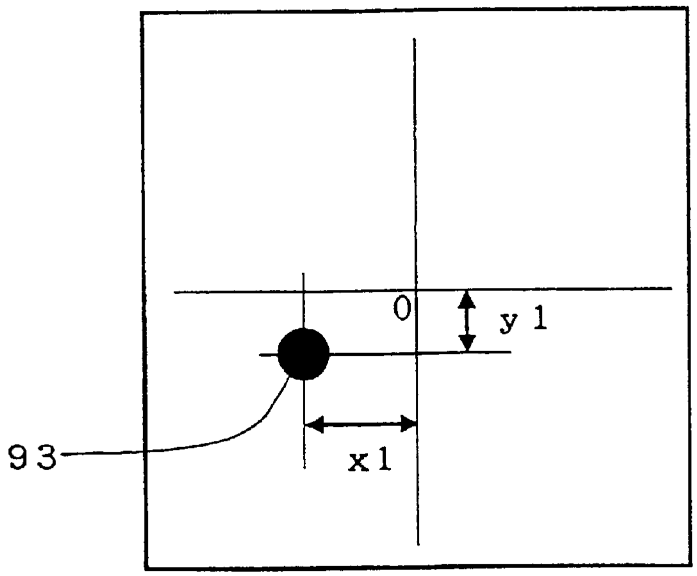
FIGS. 14 and 15 show examples of object images produced on CCDs of CCD cameras facing the opposite end faces of the block at the first detecting station FIG. 12, wherein black dots represent the respective markings on opposite end faces of the block.
Figure 15:
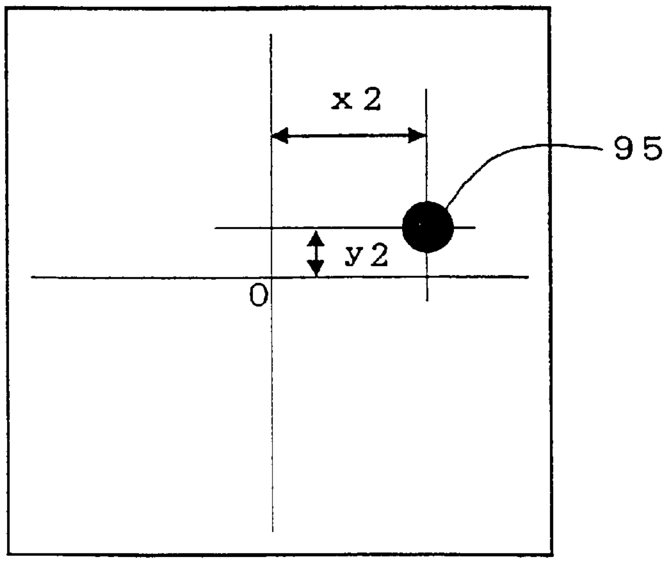

With the block P set at the first detecting station, light emitted against and reflected from the block end faces Pa, Pb and passed through the lenses 62*a*, 62*c* produces on the CCDs of the cameras 63*a* and 63*c* images of the central portions of the block ends including the hole markings T, as exemplified by illustrations in FIG. 14 for the end face Pa and in FIG. 15 for the opposite end face Pb. In the illustration, the black circular dots 93, 95 represent the position of markings T.

Information of such image data is sent to the image processing unit 90, which in turn computes the position or displacement of the circular dots 93, 95 with respect to the zero point on CCD. It is to be noted that symbols x1, y1 in FIG. 14 and x2, y2 in FIG. 15 merely exemplify the displacement of the circular dots 93, 95 for sake of convenience in the description to be made hereinafter. Information of the displacements computed by the image processing unit 90 is provided to the control 91.

On the basis of the information from the image processing unit 90, the control 91 computes the distance and direction of movement necessary for the centers of the respective markings T to reach positions corresponding to the point K2 or the zero points on CCDs of the CCD cameras 63*b*, 63*d* when the block P is moved to the second detecting station. According to the results of such computation, the control 91 further computes the distance of movement of the respective slide carriages 15, 17 along the guides 11, 13 on the arm assemblies 7, 9 and also the amount of angular movement of the arm assemblies 7, 9 necessary for the centers of the markings T to reach the point K2. In the exemplified case of FIGS. 14 and 15, the slide carriage 15 should move linearly rightward as seen FIG. 13 for a distance corresponding to Lx+x1 and downward as seen in the same drawing for a distance corresponding to Ly−y1, while the other carriage 17 should move similarly for a distance corresponding to Lx−x2 and a distance corresponding to Ly+y2.

For effecting such movements of the slide carriage 15, 17 and of the arm assemblies 5, 7, the control 91 generates electrical signals to activate the servo motors 35, 37 to drive their lead screws 31, 33, thereby moving the carriages 15, 17 independently along their linear guides 11, 13 for respective computed distances. Simultaneously, the control 91 transmits electrical signals to activate the servo motors 43, 44 to rotate the respective worm gears 41 for rotating the sector gears 39 in clockwise direction as seen in FIG. 3 about the shafts 1*a*, 1*b*, thereby pivoting the arm assemblies 7, 9 independently for the respective computed angular distances. The motors 35, 37 and 43, 44 are stopped when each of their rotary encoders has counted the computed linear or angular distance. Thus, the block P on the carriages 19, 21 is moved to the second detecting station as shown in FIG. 16 with the block ends Pa, Pb facing the CCD cameras 63*b*, 63*d*, respectively.

Figure 16:
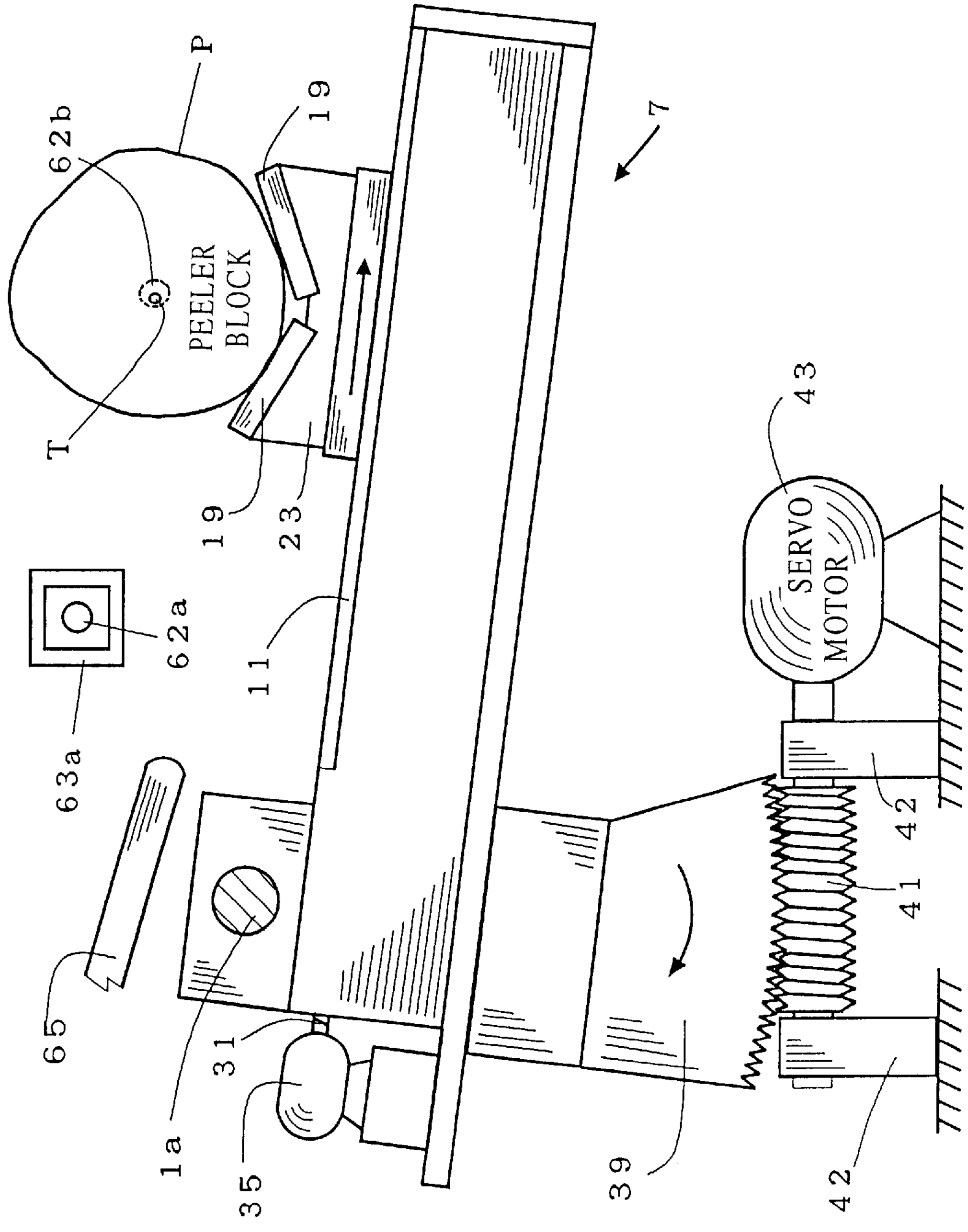
FIG. 16 is an illustrative front view similar to FIG. 13, but showing the state of apparatus wherein the peeler block has moved to a second detecting station.
Figure 17:
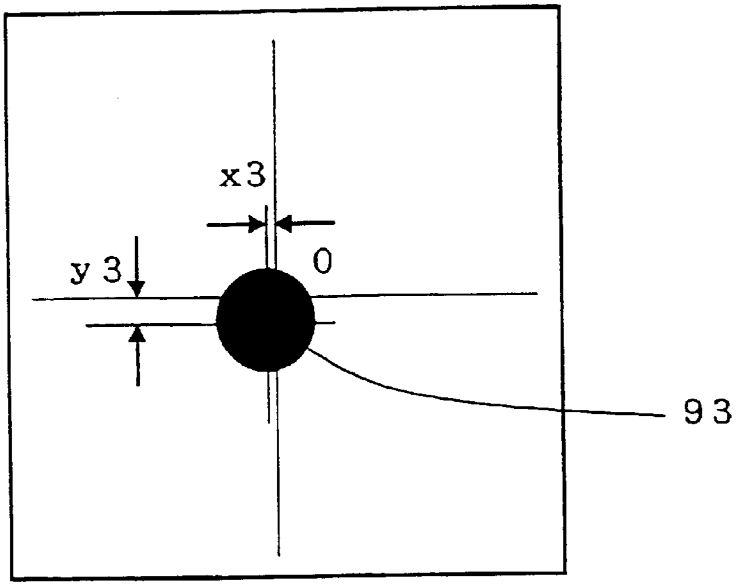
FIGS. 17 and 18 show examples of object images produced on CCDs of CCD cameras facing the opposite end faces of the block located at the second detecting station FIG. 16, wherein black dots also represent the respective markings on the block.
Figure 18:
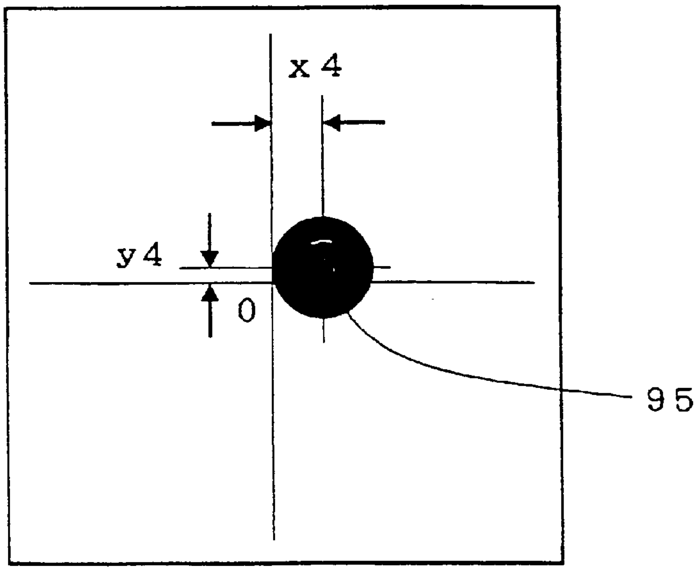

After the block P has moved to the second detecting station as shown in FIG. 16, detection of the markings T is performed by the CCD cameras 63*b*, 63*d* in the same manner as done at the first detecting station. The results from the detection are exemplified in FIGS. 17 and 18. It is to be noted the black circular dots 93, 95 in FIGS. 17 and 18 are not positioned exactly on the zero point on the CCDs of the cameras 63*b*, 63*d*. As mentioned in the description of the Background of the Invention, this is due to relatively short focal length, or 16 mm, of the lenses 62*a*, 62*c* and hence their poor resolution capability.

Information of image data obtained by the CCD cameras 63*b*, 63*d* is sent to the image processing unit 90, which in turn computes the displacement of the dots 93, 95 with respect to the zero point on the CCD, the results of which are exemplified by symbols x3, y3 in FIG. 17 for the dot 93 for the marking T on the block end face Pa and x4, y4 in FIG. 18 for the dot 95 for the marking T on the opposite end face Pb. Information of the displacements calculated by the image processing unit 90 is sent to the control 91, which then computes the distance and direction of movement necessary for the centers of the respective markings T to reach positions corresponding to the point K3 when the block P is moved to the third station. The control 91 further computes the distance of linear movement of the slide carriage 15, 17 and the amount of angular movement of the arm assemblies 7, 9 necessary for the centers of the respective markings T to reach the target point. In the exemplified case of FIGS. 17 and 18, the slide carriage 15 should move linearly for a distance corresponding to Mx+x3 and upward for a distance corresponding to My+y3, while the other carriage 17 should move similarly for a distance corresponding to Mx−x4 and a distance corresponding to My−y4.

Figure 19:
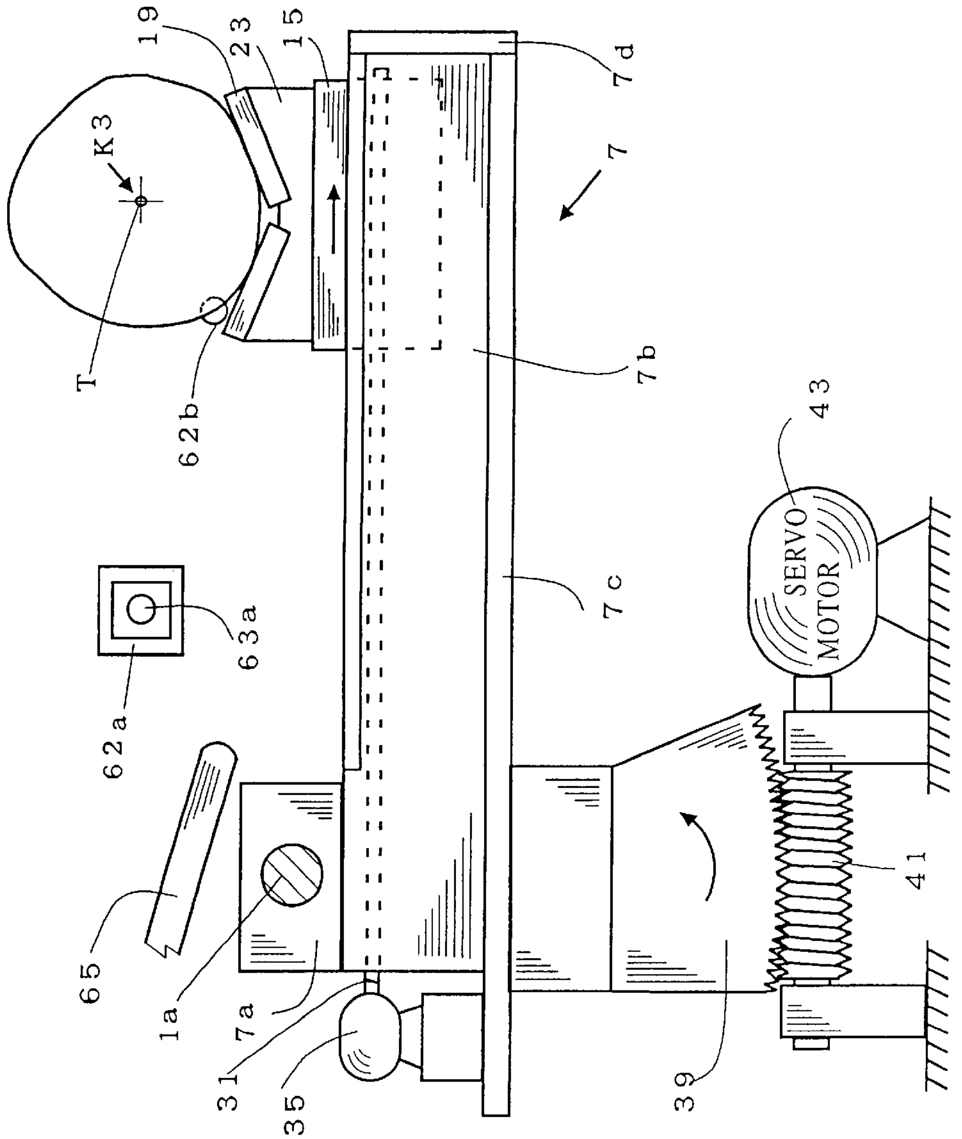
FIG. 19 is an illustrative front view similar to FIG. 13, but showing the state of apparatus wherein the peeler block has moved to a third station.

For effecting such movements, the control 91 generates electrical signals to activate the servo motors 35, 37 for moving the carriages 15, 17 independently along their linear guides 11, 13 for respective computed distances. Simultaneously, the control 91 transmits electrical signals to activate the servo motors 43, 44 to rotate the respective worm gears 41 for pivoting the arm assemblies 7, 9 independently for the respective computed angular distances. The motors 35, 37 and 43, 44 are stopped when each of their rotary encoders has counted the computed linear or angular distance. Thus, the block P is moved to the third station as shown in FIG. 19, where the centers of the respective markings T are positioned at the point K3.

As it would be now apparent from the foregoing description, the first paired CCD cameras 63*a*, 63*c* having lenses 62*a*, 62*c* with relatively short focal length and hence wide-angle viewing capability can assure that the marking T falls within the image pickup area on CCD at the first detecting station. Because the block P is then transferred to the second station after the markings T have been detected and also in such a way that the detected markings T may reach position corresponding to the center of lenses 62*b*, 62*d* of the second paired CCD cameras 63*b*, 63*d* according to the computed data from the control 91, the markings T of the block P placed at the second station can be detected successfully by the CCD cameras 63*b*, 63*d* with increased accuracy because of high resolution capability of their lenses 62*b*, 62*d*. Therefore, the block P which is further transferred to the third station on the basis of highly accurate image data can be positioned there with the centers of the respective markings T located at the point K3, that is with the optimum axis of the block P expending substantially in parallel to the axes of the lathe spindles.

Figure 20:
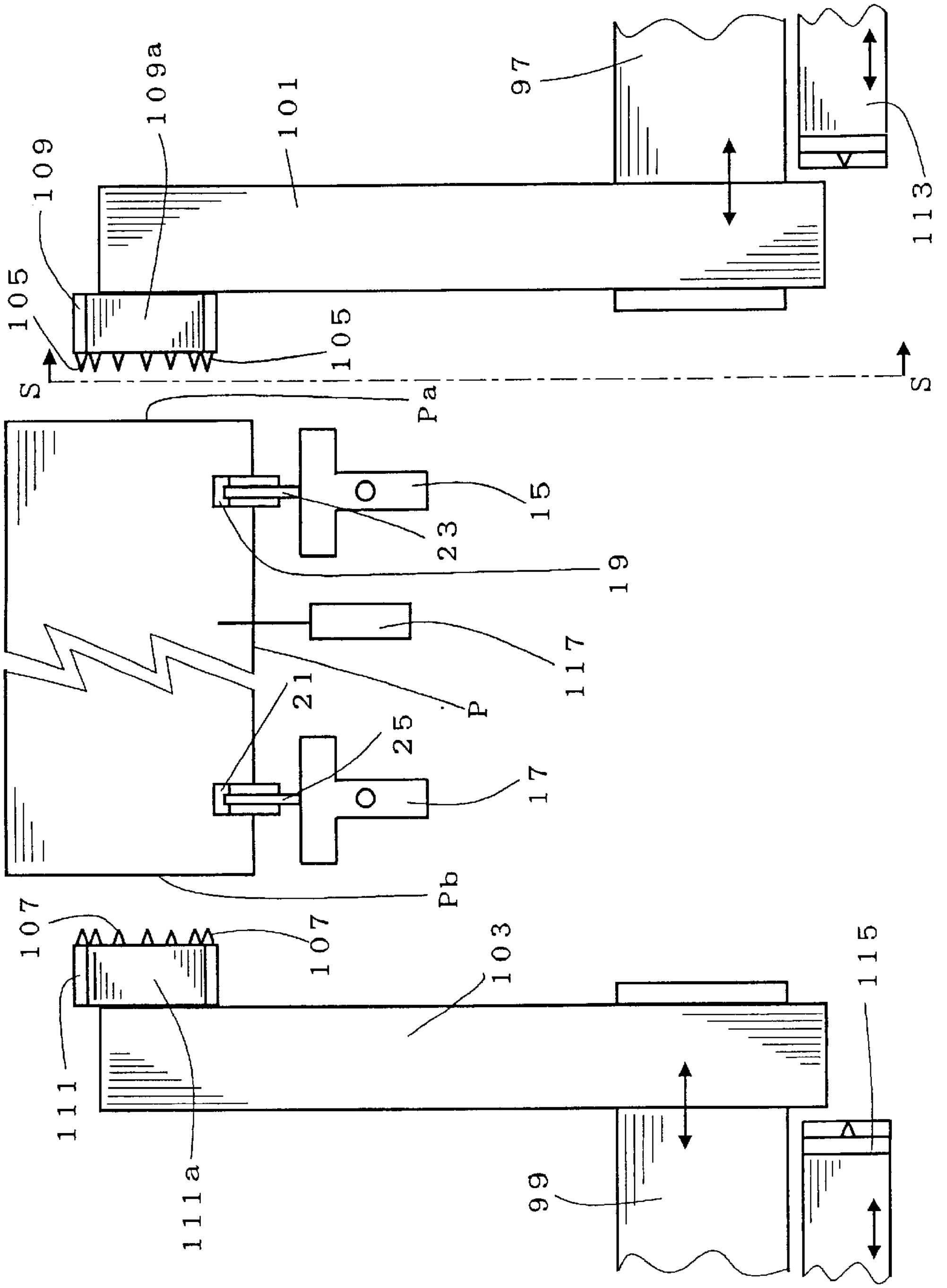
FIG. 20 is a side view showing a lathe charger for transferring a block to a rotary veneer lathe.
Figure 21:
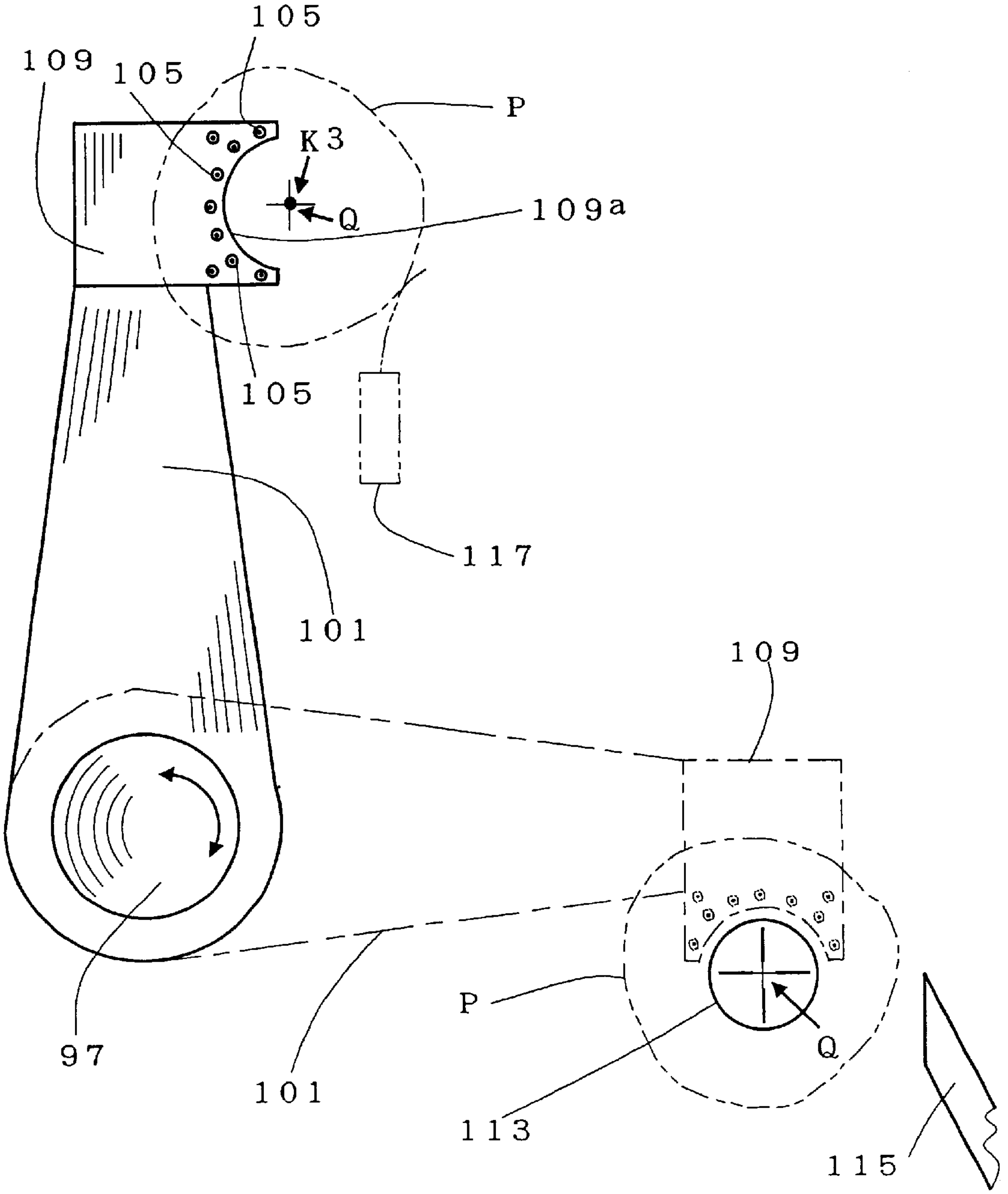
FIG. 21 is a front view of the lathe charger as seen from line S—S in arrow direction of FIG. 20.

Now referring to FIGS. 20 and 21, there is shown an apparatus for transferring the block P from the third station on the arm assemblies 7, 9 to a rotary veneer lathe (only spindle 113 and knife 115 thereof being shown in FIG. 21). This transferring apparatus includes a pair of shafts 97, 99 movable toward and away from each other as indicated by double-head arrows in FIG. 20 and also rotatable as indicated by double-head arrow in FIG. 21. This apparatus further includes a pair of pendulum arms 101, 103 fixedly mounted on the respective shafts 97, 99 and swingable between upright position as shown by solid line in FIG. 21 and a horizontal position as indicated by dash-and-dot line. Though not shown in the drawings, there is provided a servo motor for rotationally driving the shafts 97, 99 and an absolute type rotary encoder connected to either one of the shafts 97, 99 for monitoring the rotation thereof. Each pendulum arm 101, 103 has fixed at its distal end a block holder 109, 111 which is formed with a segment-shaped recess 109*a*, 111*a* and has a number of needle-like projections 105, 107 adjacent the recess 109*a*, 111*a*, as shown in FIG. 21. Each pendulum arms 101, 103 is so dimensioned and arranged that, when it is in its upright position, point Q which is the center of a circle including the arc portion of segment shape of the recess 109*a*, 111*a* coincides with the point K3. On the other hand, the rotary veneer lathe is so arranged that, when the shafts 97, 99 are rotated, or the pendulum arms 101, 103 are swung, through 90 degrees to the dash-and-dot line position, the above point Q corresponds with the axes of the lathe spindles 113. For detecting the presence of a block P at the third position on the arm assemblies 7, 9, there is provided a limit switch 117 which, when struck by the block P, generates an electrical signal to trigger the operation of the block transferring apparatus as follows.

Figure 22:
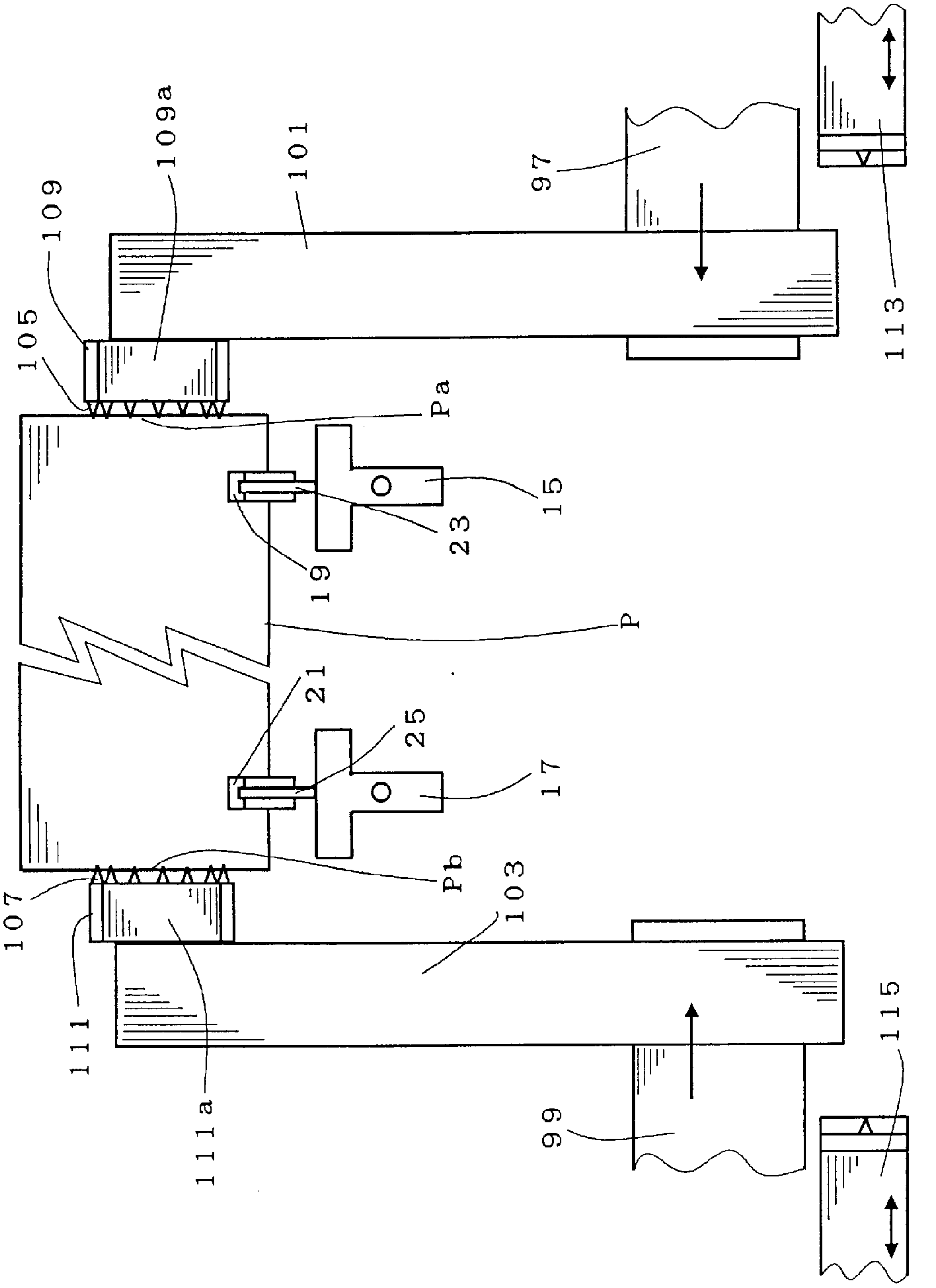
FIG. 22 is a side view similar to FIG. 20, but showing the state of the apparatus wherein the peeler block is held at its opposite ends by the lathe charger.

Initially the pendulum arms 101, 103 are placed in their upright position. When the limit switch 117 generates a signal representing that a block P is present at the third position on the arm assemblies 7, 9, the shafts 97, 99 are moved toward each other until the holders 109, 111 are brought into chucking engagement with the block as shown in FIG. 22. After the block P has been held firmly by the holders 109, 111, the servo motors 43, 44 (FIG. 3) are operated so as to slightly swing the arm assemblies 7, 9 about the shafts 1*a*, 1*b* in clockwise direction as seen in FIG. 19 for lowering the block support members 23, 25. By so doing, the block rests 19, 21 on the support members 23, 25 are moved clear of the block P, so that the block P is then supported only by the holders 109, 111. Then, the shafts 97, 99 are rotated through 90 degrees in clockwise direction as seen in FIG. 21 to swing the pendulum arms 101, 103 to their dash-and-dot line position. As the lathe spindles 113 are then moved toward each other, the block P is clamped thereby with the point Q positioned on the axes of lathe spindles 113. The shafts 97, 99 are then moved away from each other and rotated so as to return the pendulum arms 101, 103 to their original upright position.

After the block P has been transferred to the rotary veneer lathe, the control 91 generates electrical signals which cause the servo motors 35, 37 and 43, 44 to move the slide carriages 15, 17 to their original positions and to swing the arm assemblies 7, 9 to their original horizontal positions, respectively.

As will be understood readily by those skilled in the art, the present invention may be practiced in various ways other than the above-described preferred embodiment. The following will deal with changes and modification of the apparatus according to the invention.

Figure 23:
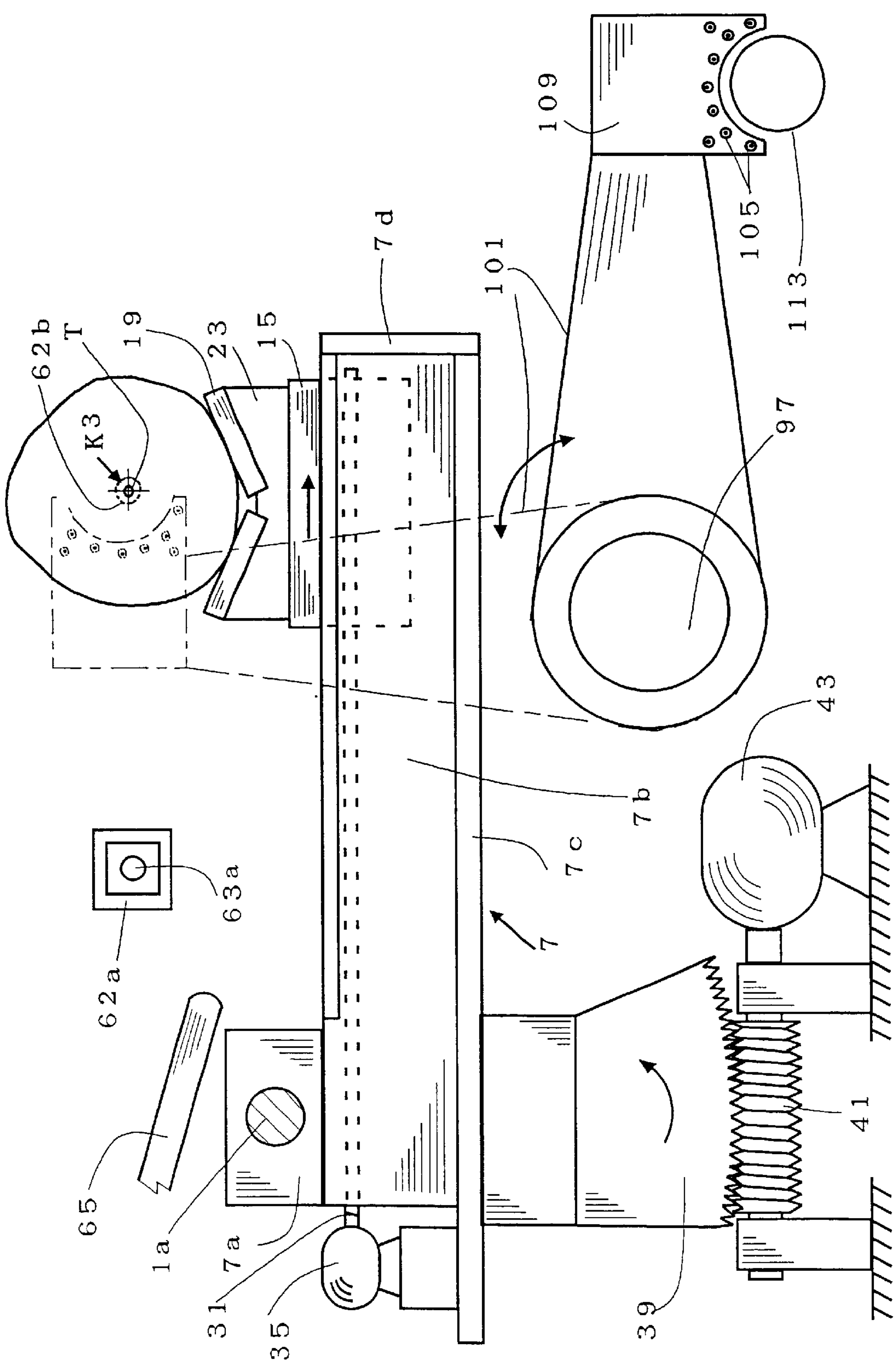
FIG. 23 is a front view showing a modified embodiment of apparatus constructed according to the present invention.

Referring to FIG. 23, this embodiment differs from the first preferred embodiment in that the second paired CCD cameras 63*b*, 63*d* are arranged with the lenses 62*b*, 62*d* thereof corresponding to the point K3, thus the third station of the first embodiment being replaced by the second detecting station. In other words, the second and third stations in the first embodiment shown in FIGS. 1 through 22 are combined as the second detecting station in this modified embodiment. Structure and arrangement other than the position of the CCD cameras 63*b*, 63*d* are substantially the same as those of the first embodiment and, therefore, like numerals and symbols are used in FIG. 23 to designate various elements and parts of the apparatus.

In this modified embodiment, detection of markings T on opposite end faces Pa, Pb of a block P by the CCD cameras 62*a*, 62*c* and the subsequent operation of the image processing unit 90 are performed in the same manner as in the first preferred embodiment. Supposing that the marking detection has resulted as shown in FIGS. 14 and 15, the center of the marking T on the block end face Pa can reach the point K3 by movement of the slide carriage 15 rightward as seen in FIG. 23 for a distance corresponding to Lx+Mx+x1 and upward for a distance corresponding to My−Ly+y1. Similarly, moving the other carriage 17 rightward for Lx+Mx−x2 and downward for My−Ly−y2 can bring the center of the marking T on the other end face Pb to the point K3. The control 91 computes the actual distances of linear movement of the slide carriages 15, 17 and of angular movement of the arm assemblies 7, 9 necessary for effecting the above movements. The control 91 generates signals to the servo motors 35, 37 and 43, 44, accordingly, causing the carriages 15, 17 to move independently along their linear guides 11, 13 for the respective computed distances and simultaneously the arm assemblies 7, 9 to swing independently for the respective computed angular distances. Thus, the block P is transferred to the second detecting station where the block ends Pa, Pb facing the second paired CCD cameras 63*b*, 63*d*, respectively, as shown in FIG. 23.

In this second station, the markings T are detected by the second paired CCD cameras 63*b*, 63*d*. For the reason of poor resolution of the lenses 62*a*, 62*c* of the first paired CCD cameras 63*a*, 63*c*, the markings T do not necessarily reach the precise position corresponding to K3. Supposing that the results of image processing by the image processor 90 are as shown by the circular dots 93, 95 in FIGS. 17 and 18, marking T on the block end face Pa can reach the point K3 by moving the slide carriage 15 rightward as seen in FIG. 23 for a distance corresponding to x3 and upward for a distance corresponding to y3. Similarly, moving the carriage 17 leftward for x4 and downward for y4 can bring the marking T on the end face Pb to the point K3. Therefore, the control 91 operates to compute and generate signals to various motors so as to cause the markings T to be relocated to the point K3 so that the optimum axis of the block P extends substantially in parallel to the axes of the rotary veneer lathe spindles. The block P thus positioned at the second detecting station is transferred to a rotary veneer lathe by the apparatus as described earlier with reference to FIGS. 20, 21 and 22.

In transferring the block P to the veneer lathe in this embodiment, the pendulum arms 101, 103 are initially placed in their horizontal position as shown by solid lines in FIG. 23. The arms 101, 103 are moved to their upright position after the block has moved to the second station and the CCD cameras 63*a*, 63*c* and 63*b*, 63*d* have been moved away from each other for a distance enough to provide spaces for the pendulum arms 101, 103 to swing to the upright chucking position.

In the above first and second preferred embodiments, the block ends are moved from one detecting station to another by independently moving the slide carriages 15, 17 linearly along the arm assemblies 7, 9 while independently swinging the arm assemblies 7, 8 about the shafts 1*a*, 1*b*. That is, the movement of the block ends is accomplished by combination of the linear movement and the angular movement. As would be appreciated by those skilled in the art, the same effect can be achieved by combination of vertical and horizontal movements, as exemplified in modified embodiment shown in FIGS. 24, 25 and 26.

Referring to the drawings wherein like reference numerals or symbols denote like parts or elements, a pair of horizontal parallel members 119, 124 is disposed which are vertically movable and on which a pair of slide carriages 15, 17 is linearly slidably supported. On the carriages 15, 17 are provided support members 23, 25 with V-shaped block support rests 19, 21. The horizontal parallel member 119 have side plates 7*b*, bottom plate 7*c*, end plates 7*d* and linear guides 11. Lead screws 31, 33 are inserted through threaded holes formed in the carriages 15, 17 and connected at one ends thereof to separate reversible servo motor 35, 37 so that the carriages 15, 17 are independently reciprocally movable along the guides 11 by rotation of the lead screw 31 driven by the servo motor 35.

Figure 24:
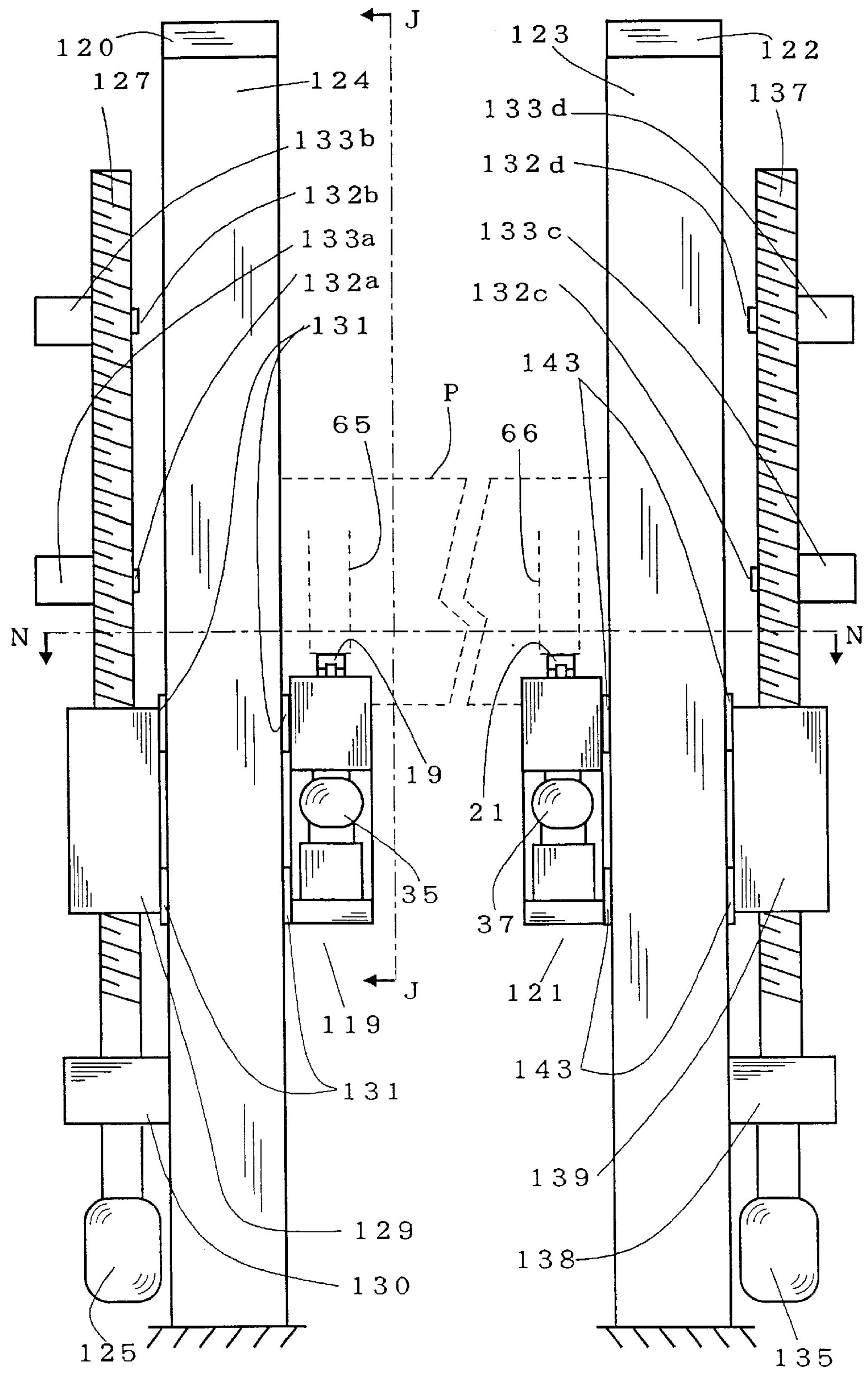
FIG. 24 is a side view showing another modified embodiment of apparatus of the present invention.
Figure 25:
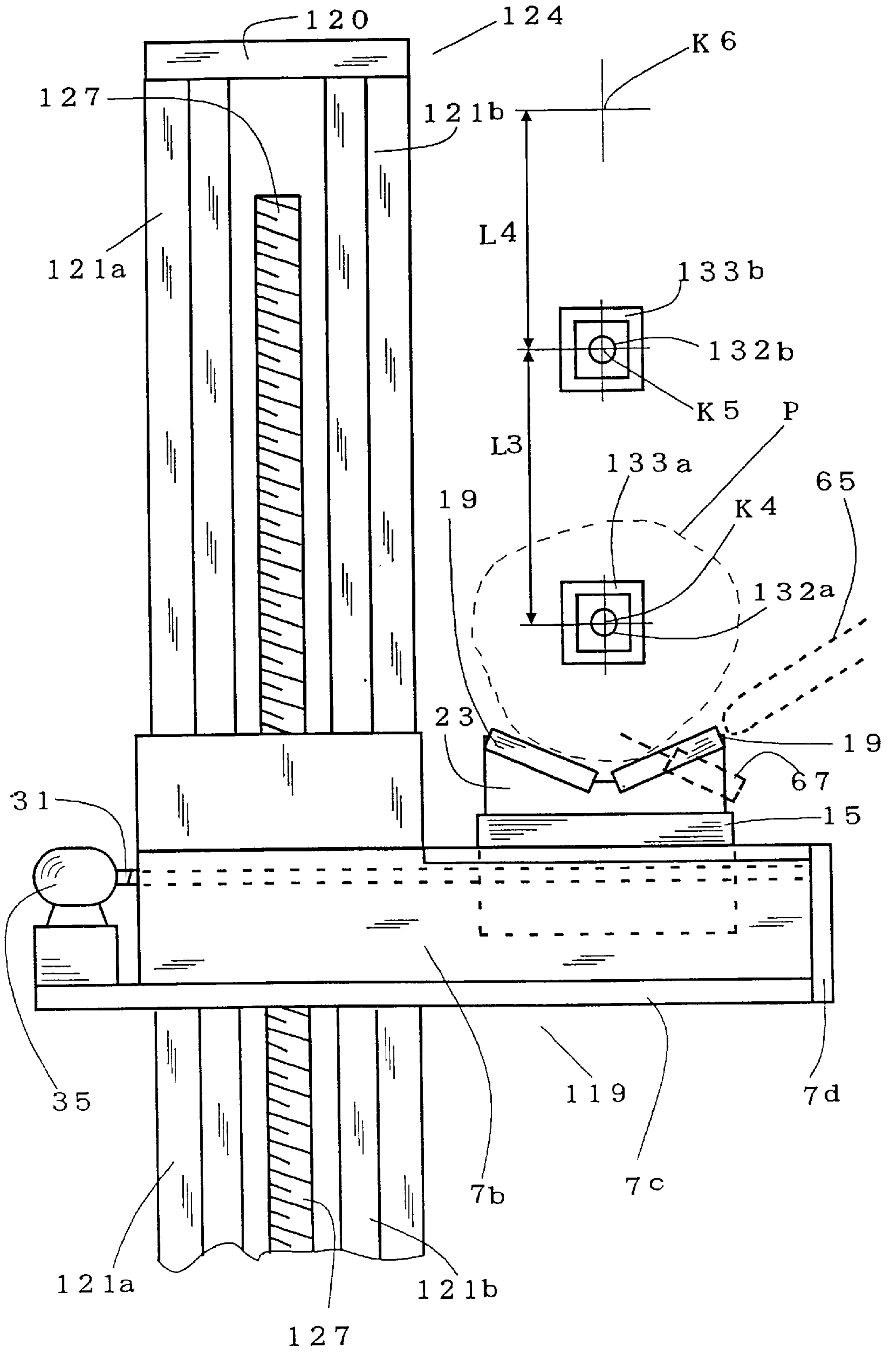
FIG. 25 is a fragmentary front view as seen from line JJ in arrow direction of FIG. 12.
Figure 26:
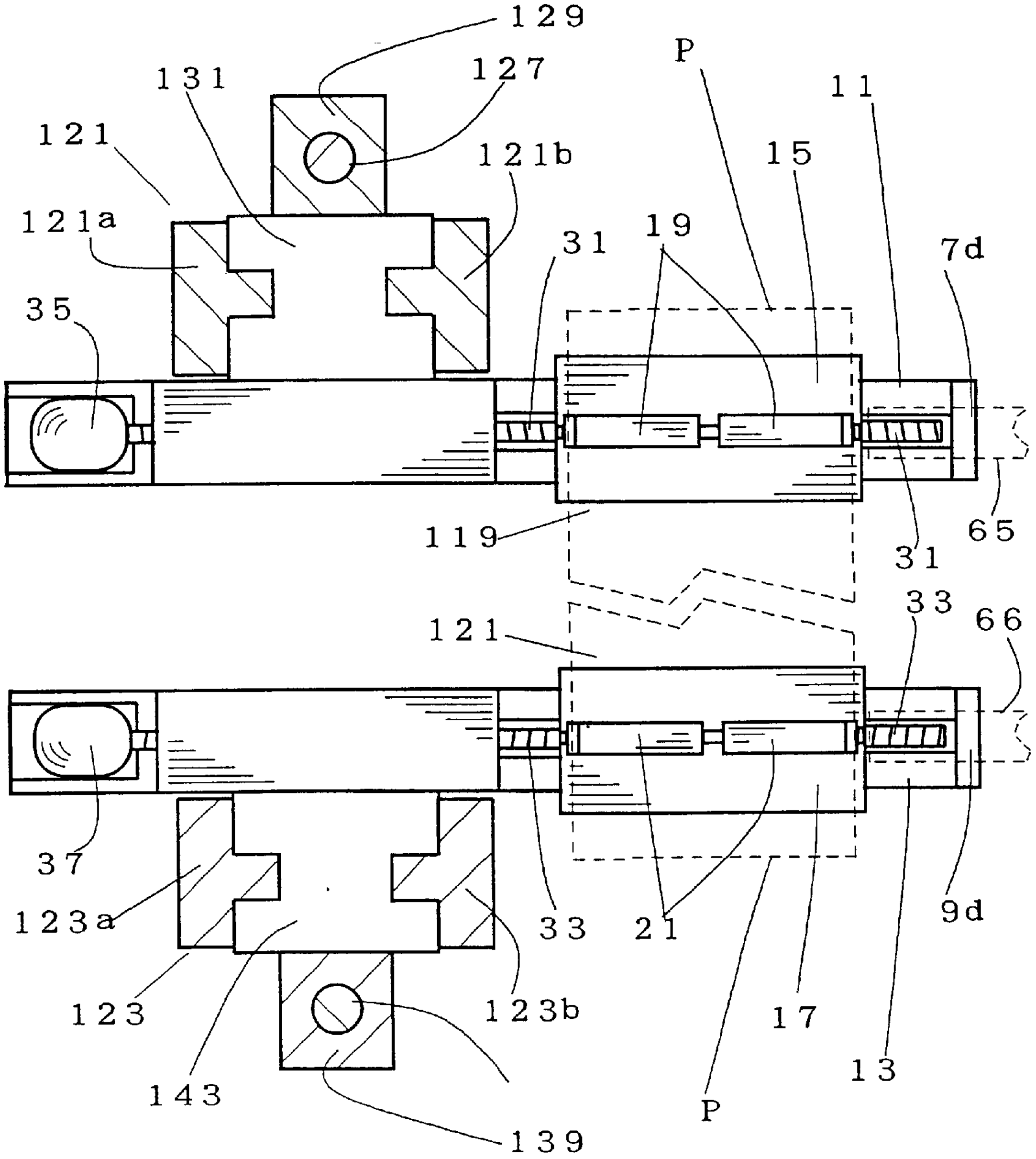
FIG. 26 is a plan view as seen from line N—N in arrow direction of FIG. 12.
Figure 27:
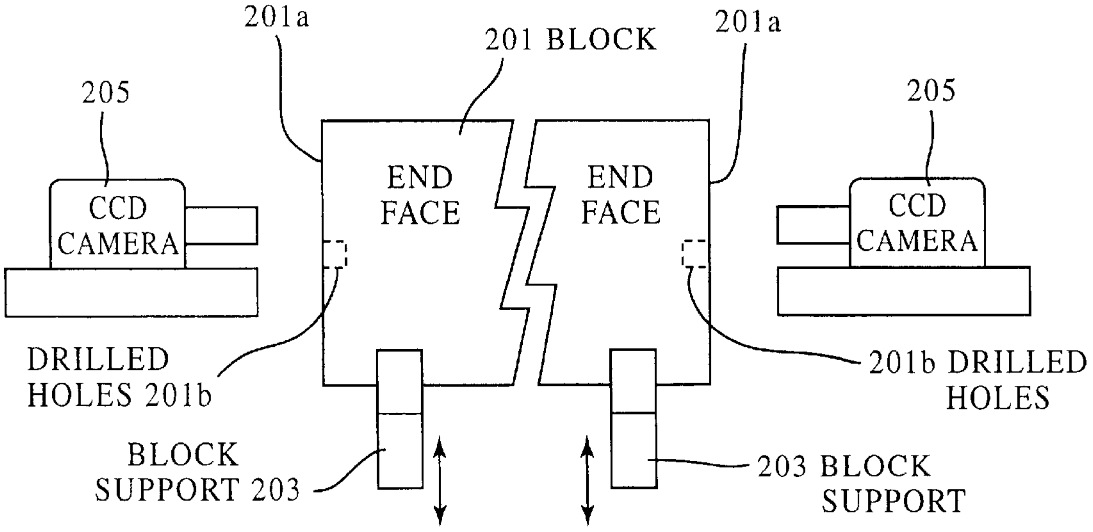
FIG. 27 is a schematic side view showing an apparatus which was used by the present inventor in an attempt to perform detection of markings on a peeler block.
Figure 28:
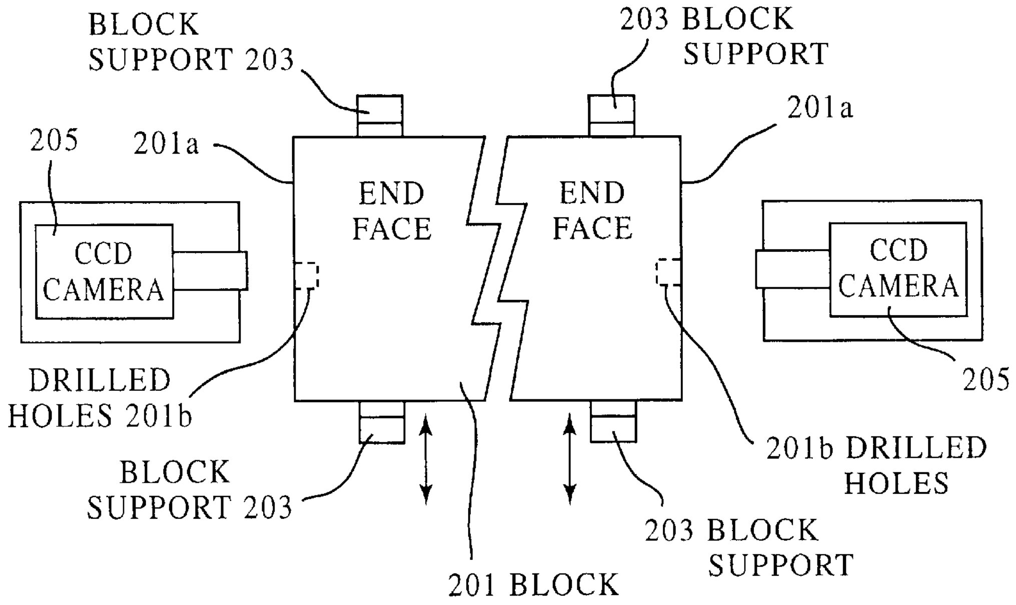
FIG. 28 is a schematic plan view of the apparatus of FIG. 27.

Adjacent to one ends (left ends as seen in FIGS. 25, 26) of and outside the horizontal parallel members 119, 124 are provided a pair of upright support assemblies 124, 123 for vertically movably supporting the horizontal members 119, 124. Since the two support assemblies 124, 123 are of substantially the same structure with a mirror-image arrangement as seen in FIGS. 24 and 26, the following description will make reference only to the support assembly 124. The support assembly 124 includes a pair of rigid uprights 124*a*, 124*b* and a pair of vertically movable slide member 131 disposed one above the other, as seen in FIG. 24, and retained by and between the uprights 124*a*, 124*b*. As shown in plan view of FIG. 26, the rigid uprights 124*a*, 124*b* have square guide projections which engage with square grooves of the slide member 131. The horizontal member 119 is rigidly connected to the slide member 131 for vertical movement therewith along the uprights 124*a*, 124*b*. A block 129 having a threaded hole formed therethrough is fixed to the slide members 131 on the side thereof which is remote from the horizontal member 119, and a lead screw 127, one end of which is connected to a reversible servo motor 125, is inserted through the threaded hole, so that rotation of the lead screw 127 by the motor 125 causes the slide member 131 and hence the horizontal member 119 to move vertically along the guide uprights 124*a*, 124*b*. In FIGS. 24 and 25, numeral 120 designate an end plate connecting the rigid uprights 124*a*, 124*b* at their top and numeral 130 shows a block having formed therethrough a hole through which plain or non-threaded portion of the lead screw 127 is inserted.

As seen in FIGS. 24 and 25, the apparatus includes two pairs of CCD cameras disposed in vertical arrangement, i.e. first pairs of cameras 133*a*, 133*c* with lenses 132*a*, 132*c* at the first detecting station and second pair of cameras 133*b*, 133*d* with lenses 132*b*, 132*d* at the second detecting station. Lenses of each paired CCD cameras are disposed with the optical axes of their lenses set in alignment with each other at points K4 and K5, respectively, wherein point K5 is spaced vertically from K4 by distance L3. Point K6 which corresponds to the point K3 in the first preferred embodiment is spaced from point K5 by distance L4. Information about the positions of these points K4, K5, K6 is previously stored in a control 91 (not shown). Though not shown in the drawings, there is provided a drive mechanism similar to that shown in FIGS. 5 and 6 for each set of CCD cameras disposed one above the other, i.e. 133*a*, 133*b* and 133*c*, 133*d*, which is operable to controllably move the cameras toward and away from the counterpart of each pair according to the length of each block to be detected. Guide bars denoted by 65, 66 and a limit switch by 67 correspond to the counterparts as already discussed with reference to the first preferred embodiment and perform the same functions.

In operation, at the beginning of each operating cycle of the apparatus, the horizontal parallel members 119, 124 and the slide carriages 15, 17 are placed at their initial positions as most clearly shown in FIG. 25 and the CCD cameras 133*a*, 133*c* and 133*b*, 133*d* have been already moved to their focusing position. When the limit switch 67 is actuated by a block P rolling down along the guide bars 65, 66 onto the V-shaped rests 19, 21, the end faces of the block P are positioned in front of the CCD cameras 133*a*, 133*c*.

Detection of markings T on opposite end faces Pa, Pb of a block P by the first paired CCD cameras 133*a*, 133*c* and the subsequent operation of the image processing unit 90 (not shown) are performed in the same manner as in the foregoing embodiments. Supposing that the markings T are displaced as shown in FIGS. 14 and 15, the control 91 computes the distances of movement necessary for the centers of the respective markings T to reach positions corresponding to the point K5 when the block P is moved to the second detecting station. According to the results of such computation, the control 91 further computes the distances of horizontal movement of the respective slide carriages 15, 17 along the guides 11, 13 and of vertical movement of the parallel horizontal members 119, 124 necessary for the centers of the markings T to reach the point K5. In the exemplified case of FIGS. 14 and 15, the slide carriage 15 should move rightward as seen in FIG. 25 for a distance x1 and upward for a distance L3+y1 while the other slide carriage 17 should move leftward for a distance x2 and upward for a distance L3−y2 so that the markings T can reach the point K5 at the second detecting station. Accordingly, the control 91 generates signals to activate the servo motors 35, 37 and 125, 135 to move the carriages 15, 17 horizontally independently along the linear guides 11 and to elevate the horizontal members 119, 121 for the respective distances computed by the control 21. Thus, the block P on the carriages 19, 21 is moved upward to the second detecting station with the block ends Pa, Pb facing the second paired CCD cameras 133*b*, 133*d*, respectively.

If the results of marking detection at the second station are as shown in FIGS. 17 and 18, the control 91 is operated to make computation accordingly in a manner similar to the above and provides electrical signals so that the carriage 15 is moved rightward for distance x3 and upward for L4+y3 and the carriage 17 to move for x4 and upward for L4−y4, with the result that the block P is moved to the third station at K6 where its optimum axis is set substantially in parallel to the axes of the lathe spindles. The block P is then clamped and transferred by the apparatus shown in FIGS. 20 to 22 to the rotary veneer lathe.

The present invention may be practiced in still other modifications. For example, support members 15, 17 which supports the block P from below may be substituted by any support means which is adapted to hold the block P in a suspended manner.

Regarding the drive mechanism for moving the paired CCD cameras toward and away from each other to their focusing position, such adjusting movement of the cameras is not required to be performed before the block is placed at the respective detecting stations, but it may be done when the block has just been placed at each of the detection stations by using any mechanism including a linear encoder such as the one 89 shown in FIGS. 8 and 10. Alternatively, though the block P is axially centered by using the apparatus shown in FIGS. 8 and 10 to find the distance L2 and the CCD cameras are adjustably moved according to the information of such distance, the operation to axially centering a block P may be dispenses with. Instead, focusing movement of the CCD cameras may performed according to the information of the current position of the block at detecting station. Additionally, CCD camera may have an automatic focusing equipment which is adapted to measure the distance between the lens and the end faces of the block placed in front of such lens and move the CCD camera accordingly for proper focusing.

Furthermore, drilled hole as the marking T may be substituted by any marking as far as it is detectable by CCD camera, such as markings painted by black ink.

As the image sensor, any device will do as far as optical information can be converted into electrical signals.

While the invention has been described and illustrated with reference to the specific embodiments, it is to be understood that the invention can be practiced in other various changes and modifications without departing from the spirit or scope thereof.

What is claimed is:

1. An apparatus for detecting markings previously formed on opposite end faces of a wood block which has an axial length and is to be placed in a rotary veneer lathe having a pair of spindles, comprising:

a pair of movable support members for supporting the block in such orientation that the axial length of the block extends across a direction in which said support members are moved;

drive means for independently and controllably moving said support members from a first detecting station through a second detecting station to a third station;

first and second pairs of image sensor means, the image sensor means of the first pair having lenses disposed so as to face the opposite end faces of the block positioned at the first detecting station and image pickup devices on which images of the markings through the lenses thereof are produced, the image sensor means of the second pair having lenses disposed so as to face said end faces of the block positioned at the second detecting station and image pickup devices on which images of the marking through the lenses thereof are produced, and the lenses of the image sensor means of the first pair having a focal length smaller than that of the lenses of the image sensor means of the second pair;

image processing means connected to each of said image sensor means for determining displacement of the image of the marking produced on the image pickup device of each image sensor means with respect to a predetermined reference point on said each image pickup device; and control means receiving information of the marking image displacement from said image processing means and operable to compute, based on information of the displacement of the marking images produced on the image pickup devices of the image sensor means of the first pair, distances and the directions of movement of the respective support members necessary for the markings on the block at the first detecting station to move to positions corresponding to the reference points on the image pickup devices of the image sensor means of the second pair and then to generate signals which causes said drive means to move said support members independently for the computed distance in the computed direction toward the second detecting station, said control means being operable also to compute, on the basis of information of the displacement of the marking images produced on the image pickup devices of the image sensor means of the second pair, the distances and the directions of movement of the respective support members necessary for the markings on the block at the second detecting station to move to predetermined positions at the third station and then to generate signals which causes said drive means to move said support members independently for the computed distance in the computed direction toward the third station, whereby at the third station the block is set with longitudinal axis thereof defined by the markings extending in parallel to axes of the spindles of the rotary veneer lathe.

2. An apparatus according to claim 1, wherein said markings include holes formed at respective centers on the opposite end faces of the block.

3. An apparatus according to claim 1, wherein said image sensor means includes a CCD camera having a charge coupled device (CCD) as the image pickup device.

4. An apparatus according to claim 1, further comprising drive mechanism for moving the image sensor means of each pair toward and away from each other according to the positions of the opposite end faces of the block placed at the first detecting station or the second detecting station.

5. An apparatus according to claim 1, further comprising a pair of parallel arm members supporting thereon said block support members and independently pivotable about an axis adjacent to the first detecting station for angular movement, and said block support members being movable linearly along said parallel arm members, wherein the movement of the block supporting members effected by the signal from said control means is accomplished by combination of the linear movement of the block support members and angular movement of said parallel arm members.

6. An apparatus according to claim 1, further comprising a pair of parallel horizontal members supporting thereon said block support members, said block support members being movable linearly along the parallel horizontal members, and said parallel horizontal members being movable vertically independently so that the block support members are raised with the vertical movement of the parallel horizontal members, wherein the movement of the supporting members effected by the signal from said control means is accomplished by combination of the horizontal linear movement of the block support members and the vertical liner movement of said parallel horizontal members.

7. An apparatus for detecting markings previously formed on opposite end faces of a wood block which has an axial length and is to be placed in a rotary veneer lathe having a pair of spindles, comprising:

a pair of movable support members for supporting the block in such orientation that the axial length of the block extends across a direction in which said support members are moved;

drive means for independently and controllably moving said support members from a first detecting station to a second detecting station;

first and second pairs of image sensor means, the image sensor means of the first pair having lenses disposed so as to face the opposite end faces of the block positioned at the first detecting station and image pickup devices on which images of the markings through the lenses thereof are produced, the image sensor means of the second pair having lenses disposed so as to face said end faces of the block positioned at the second detecting station and image pickup devices on which images of the marking through the lenses thereof are produced, and the lenses of the image sensor means of the first pair having a focal length smaller than that of the lenses of the image sensor means of the second pair;

image processing means connected to each of said image sensor means for determining displacement of the image of the marking produced on the image pickup device of each image sensor means with respect to a predetermined reference point on said each image pickup device; and control means receiving information of the marking image displacement from said image processing means and operable to compute, based on information of the displacement of the marking images produced on the image pickup devices of the image sensor means of the first pair, distances and the directions of movement of the respective support members necessary for the markings on the block at the first detecting station to move to positions corresponding to the reference points on the image pickup devices of the image sensor means of the second pair and then to generate signals which causes said drive means to move said support members independently for the computed distance in the computed direction toward the second detecting station, said control means being operable also to compute, on the basis of information of the displacement of the marking images produced on the image pickup devices of the image sensor means of the second pair, the distances and the directions of movement of the respective support members necessary for relocating the markings on the block at the second detecting station to said positions corresponding to the reference points on the image pickup devices of the image sensor means of the second pair and then to generate signals which causes said drive means to move said support members independently for the computed distance in the computed direction, whereby at the second station the block is set with longitudinal axis thereof defined by the markings extending in parallel to axes of the spindles of the rotary veneer lathe.

8. An apparatus according to claim 1, wherein said markings include holes formed at respective centers on the opposite end faces of the block.

9. An apparatus according to claim 1, wherein said image sensor means includes a CCD camera having a charge coupled device (CCD) as the image pickup device.

10. An apparatus according to claim 1, further comprising drive mechanism for moving the image sensor means of each pair toward and away from each other according to the positions of the opposite end faces of the block placed at the first detecting station or the second detecting station.

11. An apparatus according to claim 1, further comprising a pair of parallel arm members supporting thereon said block support members and independently pivotable about an axis adjacent to the first detecting station for angular movement, and said block support members being movable linearly along said parallel arm members, wherein the movement of the block supporting members effected by the signal from said control means is accomplished by combination of the linear movement of the block support members and angular movement of said parallel arm members.

* * * * *